(12) United States Patent
Tsunematsu et al.

(10) Patent No.: US 11,008,476 B2
(45) Date of Patent: *May 18, 2021

(54) ANTI-COUNTERFEIT INK COMPOSITION, ANTI-COUNTERFEIT INK, ANTI-COUNTERFEIT PRINTED MATTER, AND METHOD FOR PRODUCING THE ANTI-COUNTERFEIT INK COMPOSITION

(71) Applicant: SUMITOMO METAL MINING CO., LTD., Tokyo (JP)

(72) Inventors: Hirofumi Tsunematsu, Isa (JP); Takeshi Chonan, Isa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 340 days.

This patent is subject to a terminal disclaimer.

(21) Appl. No.: 16/063,456

(22) PCT Filed: Dec. 19, 2016

(86) PCT No.: PCT/JP2016/087803
§ 371 (c)(1),
(2) Date: Jun. 18, 2018

(87) PCT Pub. No.: WO2017/104855
PCT Pub. Date: Jun. 22, 2017

(65) Prior Publication Data
US 2019/0002712 A1    Jan. 3, 2019

(30) Foreign Application Priority Data
Dec. 18, 2015   (JP) .............................. JP2015-247931

(51) Int. Cl.
*C09D 11/037*   (2014.01)
*C01G 41/00*   (2006.01)
(Continued)

(52) U.S. Cl.
CPC ............ *C09D 11/037* (2013.01); *C01G 41/00* (2013.01); *C01G 41/006* (2013.01);
(Continued)

(58) Field of Classification Search
None
See application file for complete search history.

(56) References Cited

U.S. PATENT DOCUMENTS 5,443,579 A   8/1995   Tanaka et al.
8,268,202 B2   9/2012   Mamak et al.
(Continued)

FOREIGN PATENT DOCUMENTS

JP   H04-320466   11/1992
JP   H05-338388 A   12/1993
(Continued)

OTHER PUBLICATIONS

English translation of JP 2015/117353, Jun. 2015; 14 pages.*
(Continued)

*Primary Examiner* — Helene Klemanski
(74) *Attorney, Agent, or Firm* — Oliff PLC

(57) ABSTRACT

An anti-counterfeit ink composition, an anti-counterfeit ink, and an anti-counterfeit printed matter that transmits a visible light region, having absorption in an infrared region, and capable of judging authenticity of the printed matter, and there is provided an anti-counterfeit ink composition, an anti-counterfeit ink, an anti-counterfeit printed matter, and a method for producing the anti-counterfeit ink composition, wherein a value of an XRD peak top intensity ratio of the composite tungsten oxide ultrafine particles is 0.13 or more when a value of the XRD peak intensity is set to 1, with plane of a silicon powder standard sample (640c produced by NIST) as a reference.

13 Claims, 2 Drawing Sheets

(51) Int. Cl.
*C09D 11/50* (2014.01)
*C09D 11/101* (2014.01)

(52) U.S. Cl.
CPC ............ *C09D 11/101* (2013.01); *C09D 11/50* (2013.01); *C01P 2002/60* (2013.01); *C01P 2002/72* (2013.01); *C01P 2002/74* (2013.01); *C01P 2006/12* (2013.01); *C01P 2006/80* (2013.01)

(56) References Cited

U.S. PATENT DOCUMENTS

| | | | | |
|---|---|---|---|---|
| 2011/0248225 | A1* | 10/2011 | Mamak | C08K 3/22 252/587 |
| 2011/0297899 | A1* | 12/2011 | Tofuku | C01G 51/00 252/587 |
| 2012/0129090 | A1* | 5/2012 | Mamak | C01G 41/02 430/108.6 |
| 2016/0168407 | A1* | 6/2016 | Jarvis | G03G 7/00 424/443 |
| 2018/0370813 | A1* | 12/2018 | Tsunematsu | C01G 41/006 |
| 2019/0002708 | A1* | 1/2019 | Tsunematsu | C09D 5/32 |
| 2020/0172752 | A1* | 6/2020 | Okada | C09D 11/50 |
| 2020/0224043 | A1* | 7/2020 | Okada | B29C 64/124 |
| 2020/0270401 | A1* | 8/2020 | Kobayashi | B32B 27/20 |
| 2020/0270464 | A1* | 8/2020 | Tsunematsu | C09C 1/00 |
| 2020/0283586 | A1* | 9/2020 | Tsunematsu | C09D 11/50 |

FOREIGN PATENT DOCUMENTS

| | | | |
|---|---|---|---|
| JP | H09-261418 | A | 10/1997 |
| JP | 2004-168842 | A | 6/2004 |
| JP | 2012/506463 | A * | 3/2012 |
| JP | 2012-532822 | A | 12/2012 |
| JP | 2015-117353 | A | 6/2015 |
| WO | 2011/005631 | A2 | 1/2011 |
| WO | WO 2015/015200 | A1 * | 2/2015 |
| WO | WO 2016/121801 | A1 * | 8/2016 |
| WO | WO2017/104853 | A1 * | 6/2017 |
| WO | WO2017/104854 | A1 * | 6/2017 |
| WO | WO2018/235820 | A1 * | 12/2018 |
| WO | WO2018/235829 | A1 * | 12/2018 |

OTHER PUBLICATIONS

Feb. 14, 2017 International Search Report issued in International Patent Application No. PCT/JP2016/087803.

Feb. 14, 2017 Written Opinion of the International Searching Authority issued in International Patent Application No. PCT/JP2016/087803.

Jul. 8, 2019 Extended European Search Report issued in European Patent Application No. 16875829.0.

* cited by examiner

ANTI-COUNTERFEIT INK COMPOSITION, ANTI-COUNTERFEIT INK, ANTI-COUNTERFEIT PRINTED MATTER, AND METHOD FOR PRODUCING THE ANTI-COUNTERFEIT INK COMPOSITION

TECHNICAL FIELD

The present invention relates to an anti-counterfeit ink composition, an anti-counterfeit ink, an anti-counterfeit printed matter utilizing absorption of light in a near-infrared region, and a method for producing the anti-counterfeit ink composition.

DESCRIPTION OF RELATED ART

Conventionally, for valuable printed matters such as bankbooks and identification cards of deposits and savings, credit cards, cash cards, checks, air tickets, road pass tickets, tickets, prepaid cards, gift certificates, and securities, etc., special efforts have been made on a substrate and the printing method as a method for preventing counterfeiting.

For example, special printing in which a watermark is placed on a substrate (see Patent Document 1), printing of a fine pattern (see Patent Document 2), digital processing using geometric shape printing typified by a bar code, and the like are performed. However, cost of a paper with special watermarked printing is high, and barcode printing can easily be counterfeited by copying or the like. Further, for printing of a fine pattern, improvement of an image processing technology of a current color copy machine and a computer is required, and an ambiguous element of confirmation by human eye is added, and therefore the anti-counterfeit effect is low and it is not universal.

As an anti-counterfeit method other than the above, there is proposed a method for detecting authenticity information of the printed matter by using a printing ink that absorbs near infrared rays having a wavelength of from 800 to 2400 nm with little absorption in a visible light region of a wavelength of 300 to 780 nm. For example, in the case of printing with an ink prepared by mixing near-infrared absorbing ultrafine particles having little absorption in the visible light region and a binder resin, only specific wavelengths are absorbed when a printed surface is irradiated with an infrared laser, and therefore by reading reflected or transmitted light, authenticity can be judged.

Anti-counterfeit ink using a phthalocyanine compound has been proposed as such a printing ink that absorbs near-infrared rays (see Patent Document 3). However, the phthalocyanine compounds, which are near-infrared absorbing ultrafine particles, have a disadvantage that they are inferior in weather resistance because their absorption properties are reduced by an influence of temperature, ultraviolet rays, and the like.

Meanwhile, a dispersion film containing hexaboride fine particles such as Y and La, ruthenium oxide fine particles and the like is known as a solar radiation shielding film for insulating near-infrared rays of sunlight, and an idea of applying this film to an anti-counterfeit ink has been proposed (see Patent Document 4). However, when the solar radiation shielding film is applied to the anti-counterfeit ink, a contrast of absorption of light with respect to transmission or reflection of light is not sufficient in a wavelength region that transmits or reflects light, and a wavelength region that absorbs light when used for coating, and therefore a reading precision and the like when used as the anti-counterfeit ink is sometimes deteriorated depending on the application.

Therefore, the present applicant discloses an anti-counterfeit ink containing composite tungsten oxide fine particles having a high contrast between the absorption in the near infrared region, and transmission or reflection in the visible light region, and excellent in weather resistance as compared with conventional materials (see Patent Document 5).

PRIOR ART DOCUMENT

Patent Document

[Patent Document 1] Japanese Patent Application Laid-Open No: 1997-261418
[Patent Document 2] Japanese Patent Application Laid-Open No. 1993-338388
[Patent Document 3] Japanese Patent Application. Laid-Open No. 1992-320466
[Patent Document 4] Japanese Patent Application Laid-Open No. 2004-168842
[Patent Document 5] Japanese Patent Application Laid-Open No. 2015-117353

SUMMARY OF THE INVENTION

Problem to be Solved by the Invention

However, even in a case of the anti-counterfeit ink containing the composite tungsten oxide fine particles disclosed in Patent Document 5, the near-infrared absorption property is insufficient, and the expression of the contrast is insufficient in some cases.

In view of such a conventional circumstance, the present invention is provided, and an object of the present invention is to provide the anti-counterfeit ink composition, the anti-counterfeit ink, and the anti-counterfeit printed matter capable of judging authenticity of the printed matter using the near-infrared absorbing ultrafine particles that transmit the visible light region and having absorption in the near-infrared region, and a method for producing the anti-counterfeit ink.

Means for Solving the Problem

In order to solve the above-described problem, and as a result of intensive studies, the present inventors found an ink composition, an ink, and a printed matter thereof containing composite tungsten oxide ultrafine particles with a value of a top intensity ratio being a predetermined value in an X-ray diffraction (hereinafter sometimes referred to as "XRD" in the present invention) pattern of the composite tungsten oxide ultrafine particles. Specifically, the present inventors found that the ink composition and the ink containing the composite tungsten oxide ultrafine particles having the value of the XRD peak top intensity ratio of 0.13 or more when the value of the XRD peak intensity ratio was set to 1, with plane (220) of a silicon powder standard sample (640c produced by NIST) as a reference, transmit light in the visible light region and have absorption in the near-infrared region and exhibits sufficient contrast. Thus, the present invention is completed.

Namely, in order to achieve the above-described object, a first invention is an anti-counterfeit ink composition containing composite tungsten oxide ultrafine particles, wherein a value of an XRD peak top intensity ratio of the composite tungsten oxide ultrafine particles is 0.13 or more when a value of the XRD peak intensity is set to 1, with plane (220) of a silicon powder standard sample (640c produced by NIST) as a reference.

A second invention is the anti-counterfeit ink composition of the first invention, wherein the composite tungsten oxide ultrafine particles are composite tungsten oxide expressed by $M_xW_yO_z$ (wherein M element is an element of one or more kinds selected from H, He, alkali metal, alkaline earth metal, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, and Yb, W is tungsten, O is oxygen, satisfying $0.001 \leq x/y \leq 1$, $2.2 \leq z/y \leq 3.0$).

A third invention is the anti-counterfeit ink composition of the first or second invention, wherein a crystallite size of each composite tungsten oxide ultrafine particle is 1 nm or more and 200 nm or less.

A fourth invention is the anti-counterfeit ink composition of any one of the first to third inventions, wherein a surface of each composite tungsten oxide ultrafine particle is coated with a compound containing at least one element selected from Si, Ti, Al, and Zr.

A fifth invention is the anti-counterfeit ink composition of any one of the first to fourth inventions, wherein a content of a volatile component of the composite tungsten oxide ultrafine particles is 2.5 mass % or less.

A sixth invention is the anti-counterfeit ink composition of any one of the first to fifth inventions, which contains a solvent, and/or a liquid uncured material of resin curable by energy rays.

A seventh invention is an anti-counterfeit ink containing the anti-counterfeit ink composition of any one of the first to sixth inventions.

An eighth invention is an anti-counterfeit printed matter including a printing section printed with the anti-counterfeit ink of the seventh invention.

A ninth invention is the anti-counterfeit printed matter of the eighth invention containing an organic binder.

A tenth invention is a method for producing an anti-counterfeit ink composition containing composite tungsten oxide ultrafine particles, a solvent and/or a liquid uncured material of resin curable by energy rays, wherein the composite tungsten oxide ultrafine particles in which a value of an XRD peak top intensity ratio of the composite tungsten oxide ultrafine particles is 0.13 or more when a value of the XRD peak intensity is set to 1, with plane (220) of a silicon powder standard sample (640c produced by NIST) as a reference, are dispersed in the solvent and/or the liquid uncured material of resin curable by energy rays.

An eleventh invention is the method for producing an anti-counterfeit ink composition of the tenth invention, wherein the composite tungsten oxide ultrafine particles are composite tungsten oxide expressed by $M_xW_yO_z$ (wherein M element is an element of one or more kinds selected from H, He, alkali metal, alkaline earth metal, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, and Yb, W is tungsten, O is oxygen satisfying $0.001 \leq x/y \leq 1$, $2.2 \leq z/y \leq 3.0$).

A twelfth invention is the method for producing an anti-counterfeit ink composition of the tenth invention or the eleventh invention, wherein a crystallite size of each composite tungsten oxide ultrafine particle is 1 nm or more and 200 nm or less.

A thirteenth invention is the method for producing an anti-counterfeit ink composition of any one of the tenth to twelfth inventions, wherein a surface of each composite tungsten oxide ultrafine particle is coated with a compound containing at least one element selected from Si, Ti, Al, and Zr.

A fourteenth invention is the method for producing an anti-counterfeit ink composition of any one of the tenth to thirteenth inventions, wherein a content of a volatile component in the composite tungsten oxide ultrafine particles is 2.5 mass % or less.

Advantage of the Invention

By using an anti-counterfeit ink composition and an anti-counterfeit ink of the present invention, it is possible to provide an anti-counterfeit printed matter that cannot be duplicated by copying, etc., capable of mechanically, easily, and reliably judging authenticity regardless of visual judgment, and excellent in weather resistance and light resistance, by using the anti-counterfeit ink composition and the anti-counterfeit ink of the present invention. Then, according to the method for producing the anti-counterfeit ink composition and the method for producing an anti-counterfeit ink of the present invention, the anti-counterfeit ink composition and the anti-counterfeit ink that transmit light in the visible light region, having absorption in the near infrared region, and excellent in securing contrast between the visible light region and the near-infrared region, can be produced with high productivity.

DETAILED DESCRIPTION OF THE INVENTION

Figure 1:
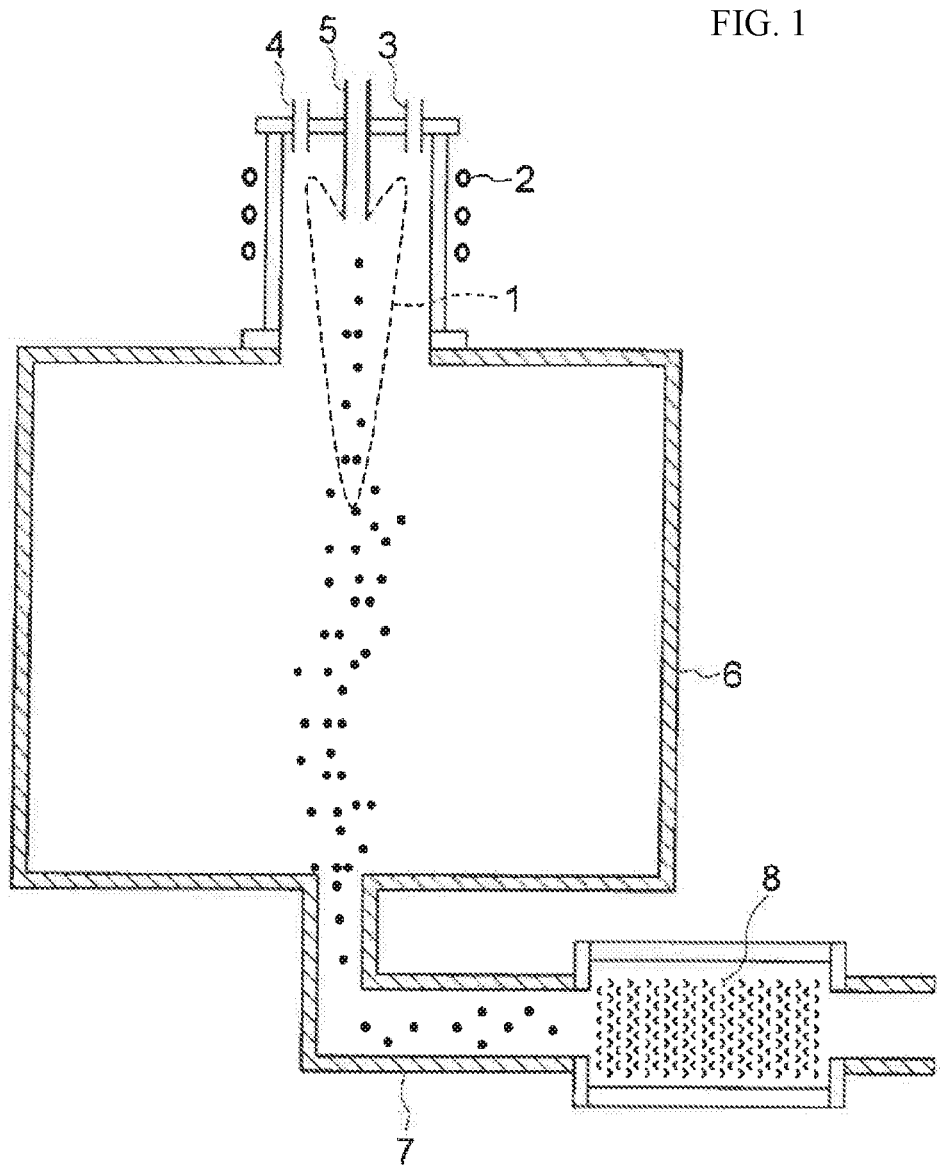
FIG. 1 is a conceptual diagram of a high-frequency plasma reaction device used in the present invention.

The anti-counterfeit ink composition of the present invention is a composition for an anti-counterfeit ink containing composite tungsten oxide ultrafine particles, having a value of the XRD peak top intensity ratio of 0.13 or more when the value of the XRD peak intensity ratio is set to 1, with plane (220) of a silicon powder standard sample (640c produced by NIST) as a reference. In addition to the composite tungsten oxide ultrafine particles, the anti-counterfeit ink composition of the present invention includes a solvent, and/or a liquid uncured material of resin curable by energy rays.

Further, the anti-counterfeit ink of the present invention is obtained by adding desired organic binder, pigment, dye, and various desired additives to the anti-counterfeit ink composition.

Further, the anti-counterfeit printed matter of the present invention can be obtained by coating or printing the surface of a substrate to be printed with the anti-counterfeit ink by an ordinary method. In this case, the anti-counterfeit printed matter can be formed by removing the solvent in the anti-counterfeit ink by evaporation or the like to fix it to the surface of the substrate to be printed, and by curing the liquid uncured material of resin curable by energy rays under irradiation of the energy rays, and fixing it to the substrate to be printed.

Embodiments of the present invention will be described hereafter in an order of [a] Composite tungsten oxide ultrafine particles, [b] Method for synthesizing the composite tungsten oxide ultrafine particles, [c] Volatile component of the composite tungsten oxide ultrafine particles and drying treatment method therefore, [d] Anti-counterfeit ink composition and anti-counterfeit ink, [e] Method for producing the anti-counterfeit ink composition and producing the anti-counterfeit ink, and [f] anti-counterfeit printed matter.

[a] Composite Tungsten Oxide Ultrafine Particles

Explanation will be given for the composite tungsten oxide ultrafine particles in an order of (1) XRD peak top intensity ratio, (2) Constituent element ratio, (3) Crystal structure, (4) BET specific surface area, (5) Volatile component content ratio, and (6) Conclusion.

(1) XRD Peak Top Intensity Ratio

In the present invention, it is found that the near infrared absorbing ultrafine particles used for the anti-counterfeit ink composition and the anti-counterfeit ink, are the composite tungsten oxide ultrafine particles in which the value of a peak top intensity ratio is a predetermined value in an XRD pattern of the composite tungsten oxide ultrafine particles, and specifically are the composite tungsten oxide ultrafine particles in which the value of the XRD peak top intensity ratio is 0.13 or more when the XRD peak intensity is set to 1, with plane (220) of a silicon powder standard sample (640 c produced by NIST) as a reference, under the same measurement condition as the composite tungsten oxide ultrafine particles to be measured.

Further, in the anti-counterfeit ink composition and the anti-counterfeit ink described later, it is more preferable that the crystallite size of each composite tungsten oxide ultrafine particle is 1 nm or more and 200 nm or less.

The XRD peak top intensity of the composite tungsten oxide ultrafine particles is closely related to the crystallinity of the ultrafine particles, and is closely related to a free electron density of the ultrafine particles, and has a great influence on infrared ray absorption properties of the ultrafine particles. Then, when the XRD peak top intensity of the composite tungsten oxide ultrafine particle is 0.13 or more, a desired near-infrared absorption property can be obtained. The desired near-infrared absorption property is that when the transmittance of light having a wavelength of 550 nm which is a visible light region is adjusted to about 70%, the transmittance of light having a wavelength of 1000 nm which is a near-infrared region is set to about 1/7 or less of the light transmittance in a visible light region. When the near-infrared ray absorption properties are exhibited, the contrast between visible light and near-infrared light becomes clear.

When the value of the XRD peak top intensity ratio of the composite tungsten oxide ultrafine particle is 0.13 or more, the free electron density is secured in the ultrafine particle, and the above-described near-infrared absorption properties are exhibited. On the other hand, it is preferable that the peak top intensity ratio is 0.7 or less.

Note that the XRD peak top intensity is the peak intensity at 2θ where the peak count is highest in the X-ray diffraction pattern. Then, in hexagonal Cs composite tungsten oxide and Rb composite tungsten oxide, the peak count 2θ in the X-ray diffraction pattern appears in a range of 23° to 31°.

The XRD peak top intensity of the composite tungsten oxide ultrafine particles will also be explained from a different viewpoint.

The fact that the value of the XRD peak top intensity ratio of the composite tungsten oxide ultrafine particle is 0.13 or more, shows that the composite tungsten oxide ultrafine particles with good crystallinity containing almost no hetero phases have been obtained. Namely, it is considered that the obtained composite tungsten oxide ultrafine particles are not amorphized. As a result, it is considered that by dispersing the composite tungsten oxide ultrafine particles containing almost no hetero phases in a liquid medium transmitting visible light, near infrared shielding properties can be sufficiently obtained.

Note that in the present invention, the "hetero phase" means a phase of a compound other than the composite tungsten oxide.

For measuring the XRD peak top intensity of the above-described composite tungsten oxide ultrafine particles, a powder X-ray diffraction method is used. At this time, in order to have objective quantitativeness in comparison between samples, it is necessary that standard samples are measured under the same conditions, and a comparison between samples is performed using the XRD peak top intensity ratio of the ultrafine particles with respect to the peak intensity of the standard sample. It is desirable to use a universal silicon powder standard sample (NIST, 640c) as a standard sample. In order to have more quantitativeness, it is desirable that the other measurement conditions are always constant, and a sample holder having a depth of 1.0 mm is filled with an ultrafine particle sample by a known operation during X-ray diffraction measurement. Specifically, a sample holder with a depth of 1.0 mm is filled with the ultrafine particle sample by a known operation in X-ray diffraction measurement. Specifically, in order to avoid a preferential orientation (crystal orientation) in the ultrafine particle sample, it is preferable to fill the sample holder randomly and gradually, and fill the sample holder as densely as possible without unevenness.

As an X-ray source, an X-ray tube having Cu as an anode target material is used in an output setting of 45 kV/40 mA, and measurement is performed by powder X-ray diffraction method of θ-2θ in a step scan mode (step size: 0.0165° (2θ) and counting time: 0.022 msec/step).

At this time, the XRD peak intensity is varied according to the use time of the X-ray tube, and therefore it is preferable that the use time of the X-ray tube is almost the same among samples. In order to ensure objective quantification, it is necessary that a difference between the samples during the use time of the X-ray tube be at most 1/20 or less of a predicted lifetime of the X-ray tube. As a more preferable measurement method, there is a method for calculating the XRD peak intensity ratio by performing measurement of the silicon powder standard sample every time the X-ray diffraction pattern of the composite tungsten oxide ultrafine particles is measured. Such a measurement method is used in the present invention. The X-ray tube predicted lifetime of a commercially available X-ray device is mostly several thousand hours or more and the measurement time per sample is several hours or less, and therefore by performing the above-described preferable measurement method, an influence on the XRD peak top intensity ratio due to the use time of the X-ray tube can be made negligibly small.

Further, in order to keep the temperature of the X-ray tube constant, a cooling water temperature for the X-ray tube is preferably kept constant.

Note that the XRD pattern of the composite tungsten oxide ultrafine particles contained in the anti-counterfeit ink composition after being disintegrated, pulverized or dispersed described later, is also maintained in the XRD pattern of the composite tungsten oxide ultrafine particles contained in the anti-counterfeit ink and the anti-counterfeit printed matter in which the anti-counterfeit ink composition of the present invention is used. Note that the crystal structure and the crystallite size can be obtained by analyzing the XRD pattern obtained when measuring the XRD peak top intensity.

(2) Constituent Element Ratio

The composite tungsten oxide expressed by $M_xW_yO_z$, which is a preferable embodiment of the near-infrared absorbing ultrafine particle of the present invention (wherein M element is an element of one or more kinds selected from H, He, alkali metal, alkaline earth metal, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, and Yb, W is tungsten, O is oxygen, satisfying $0.001 \leq x/y \leq 1$, $2.2 \leq z/y \leq 3.0$) is a material of dark color. Then, in an ultrafine particle state, it has a transmittance peak in the visible light region (in a wavelength range of 380 to 780 nm) and exhibits a transmission characteristic having a bottom of transmittance in the near-infrared region (800 to 2400 nm).

Further, as the M element, Cs, Rb, K, Tl, Ba, Cu, Al, Mn and In are preferable, and Cs and Rb are particularly preferable because the composite tungsten oxide is likely to have a hexagonal crystal structure and the contrast between visible light and near infrared light becomes clear.

Here, the value of x/y indicating an addition amount of the M element will be described. When the value of x/y is 0.001 or more, a sufficient amount of free electrons is generated and a desired near-infrared absorption property can be obtained. Then, as the addition amount of the M element is increased, a feed amount of the free electrons is increased and the near-infrared absorption property is also increased, but when the value of x/y is about 1, the effect is saturated. Further, when the value of x/y is 1 or less, generation of an impurity phase in the composite tungsten ultrafine particles can be avoided, which is preferable.

Next, the value of z indicating control of oxygen content will be described.

In the composite tungsten oxide ultrafine particle expressed by the general formula $M_xW_yO_z$, the value of z/y is preferably $2.2 < z/y \leq 3.0$, more preferably $2.6 \leq z/y \leq 3.0$, and most preferably $2.7 \leq z/y \leq 3.0$. This is because when the value of z/y is 2.2 or more, it is possible to avoid an appearance of a crystal phase of $WO_2$ which is not desired in the composite tungsten oxide, and chemical stability as a material can be obtained, and therefore it is possible to be applied as an effective infrared absorption material. In contrast, when the value of z/y is 3.0 or less, a required amount of free electrons is generated in the tungsten oxide and it is possible to be used as an efficient infrared shielding material.

(3) Crystal Structure

When each composite tungsten oxide ultrafine particle having a hexagonal crystal structure has a uniform crystal structure, the addition amount of the additional element M is preferably 0.2 or more and 0.5 or less, more preferably $0.29 \leq x/y \leq 0.39$ in terms of x/y. Theoretically it is considered that when z/y=3, the value of x/y becomes 0.33, thereby arranging additional elements M in all hexagonal voids.

Then, even when the composite tungsten oxide ultrafine particles take a tetragonal or a cubic tungsten bronze structure other than the above-described hexagonal crystal structure, it is effective as a near-infrared absorption material. An absorption position in the near-infrared region is likely to change depending on the crystal structure taken by the composite tungsten oxide ultrafine particle, and the absorption position in the near-infrared region is shifted to a longer wavelength side in a case of the tetragonal crystal structure than the cubic crystal structure, and the absorption position is likely to be shifted to a longer wavelength side further in a case of the hexagonal crystal structure than the tetragonal crystal structure. Further, in conjunction with a fluctuation of the absorption position, absorption in the visible light region is smallest in an order of the hexagonal crystal structure, the tetragonal crystal structure, and the cubic crystal structure in which absorption is largest among them. Therefore, for applications in which light in the visible light region is more transmitted and light in the near-infrared region is more absorbed, it is most preferable to use the hexagonal tungsten bronze. When each composite tungsten oxide ultrafine particles has a hexagonal crystal structure, transmittance of the fine particles in the visible light region is improved and absorption in the near-infrared region is improved.

As described above, in the composite tungsten oxide, when the value of the XRD peak top intensity ratio satisfies a predetermined value and in a case of the hexagonal tungsten bronze, excellent optical properties are exhibited. Further, even when each composite tungsten oxide ultrafine particle has an orthorhombic crystal structure or a monoclinic crystal structure similar to $WO_{2.72}$ called the Magneli phase, it is excellent in infrared absorption, and it is effective as a near-infrared shielding material in some cases.

Further, in the composite tungsten oxide ultrafine particles, it is preferable to be a single crystal having 50% or more volume ratio, or in other words, it is preferable to be a single crystal having less than 50% volume ratio of an amorphous phase.

When the composite tungsten oxide ultrafine particle is a single crystal, it is possible to set the crystallite size to 200 nm or less while maintaining the value of the XRD peak top intensity. Therefore a dispersed particle size thereof can be set to 1 nm or more and 200 nm or less.

In contrast, when the amorphous phase is present in a volume ratio of 50% or more or in a case of polycrystal even when the dispersed particle size of the composite tungsten ultrafine particle is 1 nm or more and 200 mu or less, the value of the XRD peak top intensity ratio of the composite tungsten ultrafine particle is less than 0.13, and as a result, the near-infrared ray absorbing properties are insufficient and the contrast between visible light and near infrared light is not sufficiently expressed in some cases. Further, a more preferable crystallite size is 200 nm or less and 10 nm or more. The value of the XRD peak top intensity ratio is 0.13 or more when the crystallite size is in a more preferable range, so that the near-infrared absorption properties are exhibited.

Further, it is possible to confirm that the composite tungsten oxide ultrafine particles are single crystals, because grain boundaries are not observed in each fine particle, but only uniform lattice stripes are observed in an electron microscope image obtained by a transmission electron microscope or the like. It is also confirmed that the volume ratio of the amorphous phase is less than 50% in the composite tungsten oxide ultrafine particles, by observing uniform lattice stripes throughout the particle, and observing almost no places of unclear lattice stripes similarly in the transmission electron microscope image. The amorphous phase is present in an outer circumferential part of the particle in many cases, and therefore by paying attention to the outer circumferential part of the particle, the volume ratio of the amorphous phase can be calculated in many cases. For example, when the amorphous phase whose lattice stripes are unclear is present in a layered manner on the particle outer circumferential part of a spherical composite tungsten oxide ultrafine particle, and when a thickness of the layer is 20% or less of the particle size of the composite tungsten oxide ultrafine particle, the volume ratio of the amorphous phase in the composite tungsten oxide ultrafine particles is less than 50%.

On the other hand, when the composite tungsten oxide ultrafine particles are dispersed in the anti-counterfeit printed matter, and when a value of a difference obtained by subtracting the crystallite size from an average particle size of the dispersed composite tungsten oxide ultrafine particles is 20% or less of the average particle size, it can be said that the composite tungsten oxide ultrafine particle is a single crystal in which the volume ratio of an amorphous phase is less than 50%.

Here, the average particle size of the composite tungsten oxide ultrafine particles can be obtained by measuring the particle size of 100 composite tungsten oxide ultrafine particles using an image processing device, from a transmission electron microscopic image of the dispersion body, and calculating the average value thereof.

Then, adjustment may be suitably performed depending on production equipment using synthesis, pulverization, and dispersion described later, so that the difference between the average particle size and the crystallite size of the composite tungsten oxide ultrafine particles dispersed in the anti-counterfeit printed matter of the present invention is 10% or less.

As described above, the average particle size of the composite tungsten oxide ultrafine particles contained in the anti-counterfeit printed matter of the present invention is preferably 200 nm or less, and more preferably 200 nm or less and 10 nm or more.

Further, each composite tungsten oxide ultrafine particle contained in the anti-counterfeit ink composition and the anti-counterfeit ink preferably has a dispersed particle size of 1 nm or more and 200 nm or less, and more preferably the dispersed particle size is 10 nm or more and 200 nm or less. This is because it is preferable that the crystallite size of the composite tungsten oxide ultrafine particle is 200 nm or less at most. Meanwhile, the crystallite size is preferably 1 nm or more, and more preferably 10 nm or more, from a viewpoint of the near-infrared absorption properties of the composite tungsten oxide ultrafine particles.

(4) BET Specific Surface Area

The BET specific surface area of the composite tungsten oxide ultrafine particles is closely related to a particle size distribution of the ultrafine particles, and at the same time, it greatly affects the near infrared absorption properties of the ultrafine particles themselves and the light resistance to suppress light coloring. When the BET specific surface area of the ultrafine particles is 30.0 m$^2$/g or more and 120.0 m$^2$/g or less, desired light resistance can be obtained, and it is preferably 30.0 m$^2$/g or more and 90.0 m$^2$/g or less, more preferably 35.0 m$^2$/g or more and 70.0 m$^2$/g or less.

A small BET specific surface area of the composite tungsten oxide ultrafine particles means that the crystallite size of each ultrafine particle is large. Accordingly, when the BET specific surface area of the ultrafine particles is less than 30.0 m$^2$/g, it is preferable that the ultrafine particles are pulverized for a long time by a medium stirring mill or the like to make the particles finer, in order to produce the anti-counterfeit ink having transparency in the visible light region. However, care should be taken not to produce a large number of ultrafine particles during pulverization each particle having a crystallite size of 1 nm or less which does not exhibit near-infrared absorption properties. This is because it is considered that when preparing the anti-counterfeit printed matter by using the anti-counterfeit ink containing a large number of ultrafine particles having a crystallite size of 1 nm or less, the anti-counterfeit printed matter becomes deep in color and may be colorized (light coloring) when the anti-counterfeit printed matter is irradiated with strong light including ultraviolet rays.

Meanwhile, even when the BET specific surface area of the ultrafine particles is larger than 200 m$^2$/g, the same tendency is exhibited in light coloring. Accordingly, when the BET specific surface area is 200 m$^2$/g or less, this indicates that the BET particle size becomes 2 nm or more, and there are almost no ultrafine particles having a crystallite size of less than 1 nm which do not contribute to the near infrared ray absorption properties. Therefore, when the BET specific surface area of the ultrafine particle is 200 m$^2$/g or less, it is possible to produce the anti-counterfeit printed matter having good light resistance.

Note that the crystallite size and the BET specific surface area of the composite tungsten oxide ultrafine particles are preferably within the above ranges even before and after the pulverization and dispersion treatment for obtaining the composite tungsten oxide ultrafine particle dispersion liquid.

(5) Volatile Component Content

The above-described composite tungsten oxide ultrafine particles contain a component volatilized by heating (sometimes described as "volatile component" in the present invention) in some cases. The volatile component is derived from a component that is adsorbed when the composite tungsten oxide ultrafine particle is exposed to a storage atmosphere or the air atmosphere or during a synthesis process. Here, specific examples of the volatile component include a case of water, or a case of the solvent of the dispersion liquid described later. For example, the volatile component is a component that volatilizes from the composite tungsten oxide ultrafine particles by heating at 150° C. or less.

As described above, the volatile component and its content in the composite tungsten oxide ultrafine particles are related to an amount of moisture adsorbed when the ultrafine particles are exposed to the atmosphere or the like and a residual amount of the solvent in the drying step of the ultrafine particles. Then, the volatile component and its content may greatly affect dispersibility in some cases, when the ultrafine particles are dispersed in the binder resin or the like.

For example, when compatibility is poor between the binder resin used for the anti-counterfeit printed matter and the volatile component adsorbed on the ultrafine particle, and further when the content of the volatile component is large in the ultrafine particle, there is a case that the composite tungsten oxide ultrafine particles are desorbed to the outside of the anti-counterfeit printed matter or peeling of the film occurs, when the produced near-infrared absorbing dispersion body is installed outdoors and exposed to sunlight, wind or rain for a long time. This is because the poor compatibility between the ultrafine particles and the binder resin causes deterioration of the anti-counterfeit printed matter to occur. Namely, this means that in the composite tungsten oxide ultrafine particles having the volatile component content of not more than a predetermined amount, whether or not there is a satisfactory dispersion of the ultrafine particles is not affected by the compatibility with a dispersion medium used in a dispersion system. Accordingly, in the composite tungsten oxide ultrafine particles of the present invention, when the content of the volatile component is not more than the predetermined amount, versatility is exhibited.

According to the intensive study by the present inventors, it is found that when the content of the volatile component is 2.5 mass % or less in the composite tungsten oxide ultrafine particles, the ultrafine particles can be dispersed in a dispersion medium used for almost all of the dispersion systems, and such composite tungsten oxide ultrafine particles become the composite tungsten oxide ultrafine particles having versatility.

On the other hand, it is also found that a lower limit of a content ratio of the volatile component is not particularly limited.

As a result, when the ultrafine particles having the volatile component content of 2.5 mass % or less are not excessively secondary aggregated, the ultrafine particles can be dispersed in resin or the like, using a method of uniformly mixing and kneading (including melt mixing) by a mixing machine such as a tumbler, a Nauta mixer, a Henschel mixer, a super mixer, a planetary mixer, and a kneading machine such as a Banbury mixer, a kneader, a roll, a single screw extruder, and a twin screw extruder.

The content of the volatile component in the composite tungsten oxide ultrafine particles can be measured by thermal analysis. Specifically, a weight reduction of a composite tungsten oxide ultrafine particle sample may be measured by holding the composite tungsten oxide ultrafine particle sample at a temperature lower than a temperature at which the composite tungsten oxide ultrafine particle is thermally decomposed and higher than a temperature at which the volatile component is volatilized. Further, when the volatile component is specified, gas mass spectrometry may be used together to analyze the volatile component.

(7) Conclusion

The value of the XRD peak top intensity and the BET specific surface area of the composite tungsten oxide ultrafine particles can be controlled by various production conditions, and for example can be controlled by a change of the production conditions such as a temperature (firing temperature), a generation time (firing time), a generation atmosphere (firing atmosphere), a form of a precursor raw material, an annealing treatment after generation, doping of an impurity element, and the like, for producing the ultrafine particles by the thermal plasma method or the solid-phase reaction method. On the other hand, the content of the volatile component of the composite tungsten oxide ultrafine particles can be controlled by a suitable setting of the production conditions such as a preservation method and a storage atmosphere of the ultrafine particles, a temperature at which the ultrafine particles dispersion liquid is dried, a drying time, and a drying method, and the like. Note that the content of the volatile component of the composite tungsten oxide ultrafine particles does not depend on the crystal structure of the composite tungsten oxide ultrafine particles or the synthesis method of the composite tungsten oxide ultrafine particles such as the thermal plasma method or the solid-phase reaction method described later.

[b] Method for Synthesizing the Composite Tungsten Oxide Ultrafine Particles

The method for synthesizing the composite tungsten oxide ultrafine particles, includes the thermal plasma method for charging a tungsten compound starting material into a thermal plasma, and the solid-phase reaction method for performing heat treatment to the tungsten compound starting material in a reducing gas atmosphere. The composite tungsten oxide ultrafine particles synthesized by the thermal plasma method or the solid-phase reaction method are subjected to dispersion treatment or pulverization and dispersion treatment.

Explanation will be given hereafter in the order of (1) Thermal plasma method, (2) Solid-phase reaction method, and (3) Synthesized composite tungsten oxide ultrafine particles.

(1) Thermal Plasma Method

Explanation will be given for the thermal plasma method in the order of (i) Raw material used for the thermal plasma method, (ii) Thermal plasma method and its conditions.

(i) Raw Material Used for the Thermal Plasma Method

When synthesizing the composite tungsten oxide ultrafine particles by the thermal plasma method, a mixed powder of the tungsten compound and the M element compound can be used as a raw material.

The tungsten compound is preferably one or more kinds selected from tungstic acid ($H_2WO_4$), ammonium tungstate, tungsten hexachloride, and tungsten hydrate obtained by adding water to the tungsten hexachloride which is dissolved in alcohol and hydrolyzed, and then evaporating the solvent.

Further, as the M element compound, it is preferable to use at least one element selected from oxides, hydroxides, nitrates, sulfates, chlorides and carbonates of M element.

The above-described tungsten compound and the above-described aqueous solution containing M element compound, are wet-mixed so that the ratio of the M element to the W element is $M_xW_yO_z$ (wherein M is the M element, W is tungsten, O is oxygen, satisfying $0.001 \leq x/y \leq 1.0$, $2.0 \leq z/y \leq 3.0$). Then, by drying the obtained mixture liquid, a mixed powder of the M element compound and the tungsten compound is obtained. Then, the mixed powder can be used as a raw material for the thermal plasma method.

Further, the composite tungsten oxide obtained by first firing of the mixed powder in an inert gas alone or in a mixed gas atmosphere of the inert gas and a reducing gas, can also be used as a raw material for the thermal plasma method. Besides, the composite tungsten oxide obtained by two stage firing such as first firing of the mixed powder in the mixed gas atmosphere of the inert gas and the reducing gas, and a second firing of the first fired material in the inert gas atmosphere, can also be used as the raw material for the thermal plasma method.

(ii) Thermal Plasma Method and its Conditions

As the thermal plasma used in the present invention, for example, any one of DC are plasma, high-frequency plasma, microwave plasma, low frequency alternating current plasma, or superimposed plasma of them, or plasma generated by an electric method of applying a magnetic field to direct current plasma, plasma generated by irradiation of a large output laser, and plasma generated by high power electron beam or ion beam, can be used. However, regardless of which thermal plasma is used, it is preferable to use thermal plasma having a high temperature part of 10000 to 15000 K, and particularly to use plasma capable of controlling the time for generating the ultrafine particles.

The raw material fed into the thermal plasma having the high temperature part is evaporated instantaneously in the high temperature part. Then, the evaporated raw material is condensed in the course of reaching a plasma tail flame part, and is rapidly solidified outside of the plasma flame, thereby producing the composite tungsten oxide ultrafine particles.

A synthesis method will be described with reference to FIG. 1 taking as an example a case of using a high-frequency plasma reaction device.

First, an inside of a reaction system constituted by an inside of a water-cooled quartz double tube and an inside of a reaction vessel 6 is evacuated to about 0.1 Pa (about 0.001 Torr) by a vacuum exhaust device. After evacuating the inside of the reaction system, this time the inside of the reaction system is filled with argon gas to make an argon gas flow system of 1 atm.

Thereafter, any gas selected from argon gas, mixed gas of argon and helium (Ar—He mixed gas), mixed gas of argon and nitrogen (Ar—$N_2$ mixed gas) is introduced into the reaction vessel as a plasma gas at a flow rate of 30 to 45 L/min. On the other hand, Ar—He mixed gas is introduced at a flow rate of 60 to 70 L/min, as the sheath gas to be flowed to immediately outside of the plasma region.

Then, an alternating current is applied to the high-frequency coil 2 to generate thermal plasma by a high-frequency electromagnetic, field (frequency 4 MHz). At this time, high-frequency power is set to 30 to 40 kW.

Further, the mixed powder of the M element compound and the tungsten compound obtained by the above-described synthesis method, or a raw material of the composite tungsten oxide is introduced from the raw material powder feeding nozzle 5 into the thermal plasma at a feed rate of 25 to 50 g/min, using the argon gas of 6 to 98 L/min fed from a gas feeding device 11 as a carrier gas, and a reaction is caused for a predetermined time. After the reaction, the generated composite tungsten oxide ultrafine particles are deposited on a filter 8, and therefore the deposited particles are recovered.

The carrier gas flow rate and the raw material feed rate greatly affect the generation time of the ultrafine particles. Therefore, it is preferable that the carrier gas flow rate is set to 6 L/min or more and 9 L/min or less and the raw material feed rate is set to 25 to 50 g/min.

Further, the plasma gas flow rate is preferably 30 L/min or more and 45 L/min or less, and a sheath gas flow rate is preferably 60 L/min or more and 70 L/min or less. The plasma gas has a function of keeping a thermal plasma region having a high temperature part of 10000 to 15000 K, and the sheath gas has a function of cooling an inner wall surface of a quartz torch in the reaction vessel and preventing melting of the quartz torch. At the same time, the plasma gas and the sheath gas affect the shape of the plasma region, and therefore these gas flow rates are important parameters for shape control of the plasma region. As the plasma gas flow rate and the sheath gas flow rate are increased, the shape of the plasma region extends in a gas flow direction, and a temperature gradient of the plasma tail flame part becomes gentle, and therefore it becomes possible to lengthen the generation time of the ultrafine particles to be produced and to produce the ultrafine particles with high crystallinity. On the contrary, as the plasma gas flow rate and the sheath gas flow rate are decreased, the shape of the plasma region shrinks in the gas flow direction, and the temperature gradient of the plasma tail flame part becomes steep, and therefore it becomes possible to shorten the generation time of the ultrafine particles to be produced and to form the ultrafine particles having a large BET specific surface area. As a result, the value of the XRD peak top intensity ratio of the composite tungsten oxide ultrafine particles can be set to a predetermined value.

When the composite tungsten oxide obtained by synthesis using the thermal plasma method has a crystallite size exceeding 200 nm, or when the dispersed particle size of the composite tungsten oxide in the anti-counterfeit ink composition obtained from the composite tungsten oxide obtained by the thermal plasma method exceeds 200 nm, the pulverization and dispersion treatment described later can be performed. When the composite tungsten oxide is synthesized by the thermal plasma method, the effect of the present invention is exhibited by appropriately selecting the conditions for the pulverization and dispersion treatment thereafter and setting the value of the XRD peak top intensity ratio to 0.13 or more, thereby suppressing the difference between the average particle size and the crystallite size of the composite tungsten oxide ultrafine particles to 20% or less in the anti-counterfeit printed matter.

(2) Solid-Phase Reaction Method

The solid-phase reaction method will be described in an order of (i) Raw material used in the solid-phase reaction method, and (ii) Firing in the solid-phase reaction method and its conditions.

(i) Raw Material Used in the Solid-Phase Reaction Method

When synthesizing the composite tungsten oxide ultrafine particles by the solid-phase reaction method, a tungsten compound and an M element compound are used as the raw material.

The tungsten compound is preferably one or more kinds selected from tungstic acid ($H_2WO_4$), ammonium tungstate, tungsten hexachloride, and tungsten hydrate obtained by adding water to the tungsten hexachloride which is dissolved in alcohol and hydrolyzed, and then evaporating the solvent.

Further, the element M compound used for producing the raw material of the composite tungsten oxide ultrafine particles expressed by the general formula $M_xW_yO_z$ (wherein M is an element of one or more kinds selected from Cs, Rb, K, Tl, Ba, satisfying $0.001 \leq x/y \leq 1$, $2.2 \leq z/y \leq 3.0$) which is a more preferable embodiment, is preferably one or more kinds selected from oxides, hydroxides, nitrates, sulfates, chlorides, carbonates of element M.

Further, a compound containing an impurity element of one or more kinds selected from Si, Al, and Zr (sometimes referred to as "impurity element compound" in the present invention) may be contained in the composite tungsten oxide ultrafine particles as a raw material. The impurity element compound does not react with the composite tungsten compound in a subsequent firing step, and works to suppress a crystal growth of the composite tungsten oxide and prevent coarsening of the crystal. The compound containing the impurity element is preferably one or more kinds selected from oxides, hydroxides, nitrates, sulfates, chlorides, carbonates, and colloidal silica and colloidal alumina having a particle size of 500 nm or less are particularly preferable.

The above-described tungsten compound, the aqueous solution con taming the M element compound, and the above-described impurity element compound are wet-mixed in such a manner that the ratio of the M element to the W element is $M_xW_yO_z$ (M is the M element, W is tungsten, O is oxygen, satisfying $0.001 \leq x/y \leq 1.0$, $2.0 \leq z/y \leq 3.0$). When the impurity element compound is contained as a raw material, the impurity element compound is wet-mixed so as to be 0.5 mass % or less. Then, by drying the obtained mixed solution, the mixed powder of the M element compound and the tungsten compound, or the mixed powder of the M element compound containing the impurity element compound and the tungsten compound can be obtained.

(ii) Firing in the Solid-Phase Reaction Method and its Conditions

One-stage firing is performed to the mixed powder of the M element compound and the tungsten compound produced by the wet-mixing, or the mixed powder of the M element compound containing the impurity element compound and the tungsten compound, in the inert gas alone or mixed gas atmosphere of the inert gas and reducing gas. At this time, a firing temperature is preferably close to a temperature at which the composite tungsten oxide ultrafine particles start to crystallize.

Specifically, the firing temperature is preferably 1000° C. or less, more preferably 800° C. or less, still more preferably 800° C. or less and 500° C. or more. By controlling the firing temperature, the value of the XRD peak top intensity ratio of the composite tungsten oxide ultrafine particles of the present invention can be set to a predetermined value. By controlling the firing temperature, the XRD peak top intensity ratio of the composite tungsten oxide ultrafine particles of the present invention can be set to a predetermined value.

In synthesizing the composite tungsten oxide, tungsten trioxide may be used instead of the tungsten compound.

(3) Synthesized Composite Tungsten Oxide Ultrafine Particles

When the anti-counterfeit ink composition and the anti-counterfeit ink (which may be described as "ink composition or the like" in the present invention) described later are prepared by using the composite tungsten oxide ultrafine particles obtained by the synthesis method using the thermal plasma method or the solid phase reaction method, the crystallite size of the ultrafine particles contained in the ink composition or the like exceeds 200 nm in some cases. In such a case, the pulverization and dispersion treatment may be performed to the composite tungsten oxide ultrafine particles in the step of producing the ink composition or the like described later. Then, if the value of the XRD peak top intensity ratio of the composite tungsten oxide ultrafine particles obtained through the pulverization and dispersion treatment is within a range of the present invention, the ink composition or the like of the present invention obtained from the composite tungsten oxide ultrafine particles and the dispersion liquid thereof exhibit excellent near infrared shielding properties.

[c] Volatile Component of the Composite Tungsten Oxide Ultrafine Particles and a Drying Treatment Method Therefore As described above, the composite tungsten oxide ultrafine particles of the present invention contain the volatile component in seine cases, but the content of the volatile component is preferably 2.5 mass % or less. However, when the composite tungsten oxide ultrafine particles are exposed to the atmosphere or the like and the content of the volatile component exceeds 2.5 mass %, the content of the volatile component can be reduced by the drying treatment.

Specifically, the composite tungsten oxide synthesized by the above-described method is pulverized and dispersed to obtain finer particles, and the composite tungsten oxide ultrafine particles of the present invention can be produced through a step (pulverization and dispersion treatment step) of producing the composite tungsten oxide ultrafine particle dispersion liquid and a step of drying the composite tungsten oxide ultrafine particle dispersion liquid thus produced to remove the solvent (drying step).

Regarding the pulverizing and dispersing step, in order to describe in detail in the "[e] Method for producing the anti-counterfeit ink composition and producing the anti-counterfeit ink" described later, the drying treatment step will be described here.

The drying treatment step is a step of applying drying treatment to the composite tungsten oxide ultrafine particle dispersion liquid obtained in a pulverizing and dispersing step described later to remove the volatile component in the dispersion liquid, to thereby obtain the composite tungsten oxide ultrafine particles of the present invention.

As facilities for drying treatment, an air dryer, a universal mixer, a ribbon mixer, a vacuum flow drier, an oscillating fluid drier, a freeze dryer, a ribbon corn, a rotary kiln, a spray dryer, a pulverized dryer, and the like are preferable from a viewpoint that heating and/or decompression is possible and mixing and recovery of the ultrafine particles is easy, but the present invention is not limited thereto.

As an example thereof, (1) A drying treatment by the air dryer, (2) A drying treatment by the vacuum flow drier, and (3) A drying treatment by a spray dryer will be described hereafter. Each drying treatment will be sequentially described hereinafter.

(1) Drying Treatment by an Air Dryer

This is a treatment method for applying drying treatment to the composite tungsten oxide ultrafine particle dispersion liquid obtained by a method described later to remove the volatile component in the dispersion liquid by an air dryer. In this case, it is preferable to perform the drying treatment at a temperature higher than the temperature at which the volatile component volatilizes from the composite tungsten oxide ultrafine particles and the temperature at which the element M is not desorbed, and 150° C. or less is preferable. The composite tungsten oxide ultrafine particles produced by the drying treatment using the air dryer are weak secondary aggregates. Even in this state, it is possible to disperse the composite tungsten oxide ultrafine particles in a resin or the like, but in order to make it easier to disperse, it is also a preferable example to disintegrate the ultrafine particles by a mash-crushing machine or the like.

(2) Drying Treatment by a Vacuum Flow Dryer

This is a treatment method for removing the volatile component in the composite tungsten oxide ultrafine particle dispersion liquid by performing the drying treatment using the vacuum flow drier. In the vacuum flow drier, drying and disintegration treatments are performed at the same time under a reduced pressure atmosphere, and therefore in addition to having a high drying rate, aggregates as seen in the above-described dried product in the air dryer are not formed. Further, because of drying in the reduced pressure atmosphere, the volatile component can be removed even at a relatively low temperature, and an amount of a residual volatile component can be minimized as well.

The drying temperature is preferably set so as to be dried at a temperature at which the element M is not desorbed from the composite tungsten oxide ultrafine particles, and it is a temperature higher than a temperature at which the volatile component is volatilized, and it is desirably 150° C. or less.

(3) Drying Treatment by a Spray Dryer

This is a treatment method for removing the volatile component of the composite tungsten oxide ultrafine particle dispersion liquid by performing drying treatment using a spray dryer. In the spray dryer, secondary aggregation due to a surface force of the volatile component hardly occurs at the time of removing the volatile component in the drying treatment. Accordingly, the composite tungsten oxide ultrafine particles that are not relatively secondary aggregated can be obtained in some cases even without disintegration treatment.

[d] Anti-Counterfeit Ink Composition and Anti-Counterfeit Ink

The anti-counterfeit ink composition and the anti-counterfeit ink of the present invention containing the above-described composite tungsten oxide ultrafine particles have low absorption in the visible light region and absorption in the near-infrared region, and therefore absorbs a specific wavelength when a printing surface thereof is irradiated with an infrared laser. Accordingly, authenticity of the printed matter obtained by printing the anti-counterfeit ink composition or the anti-counterfeit ink on one side or both sides of the substrate to be printed, can be judged from a difference in a reflection amount or a transmission amount, by irradiation of the near-infrared rays of a specific wavelength and reading its reflection or transmission.

(1) Anti-counterfeit ink composition and (2) Anti-counterfeit ink of the present invention will be described hereafter.

(1) Anti-Counterfeit Ink Composition

The anti-counterfeit ink composition of the present invention contains the composite tungsten oxide ultrafine particles of the present invention. As a result, it has a peak of transmittance in the visible light region, and therefore it is less colored and at the same time there is a bottom (absorption peak) of transmittance in the near infrared region. Therefore, by reading the information using an infrared sensor, from the printed matter on which the anti-counterfeit ink composition of the present invention is printed, it is possible to judge the authenticity of the printed matter by using the information.

Explanation will be given for (i) Composite tungsten oxide ultrafine particles, (ii) Solvent, and (iii) Liquid uncured material of resin curable by energy rays, which are contained in the anti-counterfeit ink composition.

(i) Composite Tungsten Oxide Ultrafine Particles

The transmission properties of the composite tungsten oxide ultrafine particles are also changed depending on the particle size of the ultrafine particle. Namely, the smaller the particle size of the ultrafine particle is, the greater the difference in transmittance becomes between the peak of the transmittance in the visible light region and the bottom of the absorption in the near infrared region. On the contrary, when the particle size is large, the difference in transmittance becomes small, and the absorption of the near-infrared ray is decreased with respect to the peak of a visible light transmittance. Therefore, it is desirable that the particle size of the ultrafine particle is appropriately set according to the intended use method or the like.

Further, when it is desired to maintain transparency of a transparent substrate used as a substrate to be printed, like a substantially transparent anti-counterfeit cord or a bar code, and when it is desired to maintain transparency enough to see through a background printing, it is preferable that the particle size of the composite tungsten oxide ultrafine particle is small. Particularly, in a case of the anti-counterfeit printing which emphasizes transparency in the visible light region, it is necessary to consider light scattering due to the ultrafine particles. This is because when the dispersed particle size of the ultrafine particles is smaller than 200 nm, light in the visible light region having a wavelength of 400 to 780 nm is not scattered due to scattering by geometry or Mie scattering, and therefore the anti-counterfeit printed matter does not look like semi-foggy glass, and clear transparency can be obtained.

Further, when clear transparency is required for the anti-counterfeit printed matter, the dispersed particle size of the ultrafine particle in the anti-counterfeit ink composition is preferably 200 nm or less, and more preferably 100 nm or less. When the dispersed particle size becomes 200 nm or less, light scattering is reduced to become a Rayleigh scattering region, and the scattered light is reduced in proportion to the particle size of the sixth power, and therefore transparency is improved as the particle size is decreased. Further, when the dispersed particle size becomes 100 nm or less, the scattered light is extremely reduced, which is more preferable. Further, even in the ease of the near-infrared ray, scattering is reduced by decreasing the particle size, and absorption efficiency is increased, which is preferable.

Meanwhile, when the particle size is 1 nm or more, the above light resistance can be secured, and 10 nm or more is more preferable.

The dispersed particle size of each composite tungsten oxide ultrafine particle in the anti-counterfeit ink composition and anti-counterfeit ink, and the average particle size of the composite tungsten oxide ultrafine particles dispersed in the anti-counterfeit printed matter, are different in some cases. This is because even if the composite tungsten oxide ultrafine particles are aggregated in the anti-counterfeit ink composition or the like, aggregation of the composite tungsten oxide ultrafine particles is resolved when being processed into the anti-counterfeit printed matter.

Further, all of the composite tungsten oxide ultrafine particles used as the near-infrared absorbing ultrafine particles in the present invention are excellent in weather resistance because they are inorganic ultrafine particles. In order to further improve the weather resistance, the surface of each fine particle can be coated with one or more or two or more compounds of Si, Ti, Al, and Zr. These compounds are basically transparent and do not reduce the visible light transmittance by coating.

(ii) Solvent

As a solvent to be used for the anti-counterfeit ink composition of the present invention, it is possible to use the solvent composed of one kind or more selected from water, alcohols such as ethanol, ketones such as methyl ethyl ketone, toluene, xylene, vegetable oils, compounds derived from vegetable oils, and a petroleum solvent. As the vegetable oils, drying oils such as linseed oil, sunflower oil, and tung oil, semidrying oils such as sesame oil, cottonseed oil, rapeseed oil, soybean oil, rice bran oil, and the like, non-drying oils such as olive oil, coconut oil, palm oil, dehydrated castor oil, can be used. As the vegetable oil-derived compound, fatty acid monoesters and ethers obtained by direct esterification reaction of fatty acid of vegetable oil and monoalcohol are used. It can be selected according to the purpose of use. As the petroleum type solvent, the solvent having a high aniline point so as not to erode a rubber part of the printing equipment is preferable, and Isopar E, Exxol Hexane, Exol Heptane, Exol E, Exol D30, Exol D40, Exol D60, Exol D80, Exol D95, Exol D110, Exol D130 (all of them are manufactured by Exon Mobil Corporation), and the like can be used as examples. Further, it is preferable that the content of the composite tungsten oxide ultrafine particles contained in the composite tungsten oxide ultrafine particle dispersion liquid is 0.01 mass % or more and 80 mass % or less.

(iii) Liquid Uncured Material of Resin Curable by Energy Rays

For the anti-counterfeit ink composition of the present invention, a liquid uncured material of resin curable by energy rays can be used in place of the above-described solvent. Of course, the liquid uncured material of resin curable by energy rays and the above-described solvent may be used in combination.

Here, the liquid uncured material of resin curable by energy rays used in the anti-counterfeit ink composition of the present invention includes, a liquid uncured material of resin curable by UV-rays, a liquid uncured material of resin curable by electron beams, and a liquid uncured material of resin curable by heat. Such liquid uncured materials of resins curable by these energy rays can disperse composite tungsten oxide ultrafine particles in the same manner as the solvent used for the anti-counterfeit ink composition of the present invention. Further, even in the anti-counterfeit ink composition using the liquid uncured material of resin curable by these energy rays, the content of the composite tungsten oxide ultrafine particles is preferably 0.01 mass % or more and 80 mass % or less.

Then, in the anti-counterfeit composition of the present invention, a solvent-free anti-counterfeit ink can be obtained when the liquid uncured material of resin curable by energy rays is used without using the above solvent.

Here, the liquid uncured material of resin curable by energy rays includes: monomers and oligomers such as acrylic resins having multiple bonds polymerized by radical addition as monomers and oligomers, and monomers and oligomers such as epoxy resin, phenol resin, or urethane resin having functional groups that are crosslinked two- or three-dimensionally by energy rays. For example, the liquid uncured material of the ultraviolet curable resin includes a polymerization initiator and a liquid monomer or oligomer which is polymerized by radicals generated from the polymerization initiator.

Note that when the anti-counterfeit ink composition of the present invention contains the liquid uncured material of a resin curable by energy rays, it is preferable not to contain the radical polymerization initiator from a viewpoint of storage stability.

(2) Anti-Counterfeit Ink

The anti-counterfeit ink of the present invention is obtained by adding a desired organic binder and appropriately added one or more kinds selected from the polymerization initiators, pigments and dyes, and further desired each kind of additive. The anti-counterfeit printed matter can be formed by printing the anti-counterfeit ink of the present invention on a desired substrate to be printed.

When the anti-counterfeit ink is produced from the solvent-containing anti-counterfeit ink composition out of the above-described anti-counterfeit ink compositions, the organic binder may be further added. The organic binder is not particularly limited and may be any one of the resins such as acrylic, urethane, epoxy, fluorine, vinyl, and rosin, etc., and it is possible to select the one suitable for the application.

Further, when the anti-counterfeit ink is produced from the anti-counterfeit ink composition containing the liquid uncured material of resin curable by energy rays out of the above-described anti-counterfeit ink compositions, it is preferable to add the polymerization initiator which reacts with the energy rays. In the anti-counterfeit ink containing the liquid uncured material of resin curable by energy rays, the liquid uncured material is cured to form the organic binder for the anti-counterfeit printed matter under irradiation of the energy rays.

Further the anti-counterfeit ink composition containing the liquid uncured material of resin curable by energy rays out of the anti-counterfeit ink compositions, can also be the anti-counterfeit ink as well as being the anti-counterfeit ink composition, on the basis of its constitution.

For example, the color pigment that transmits the near-infrared rays can be contained. By containing such a color pigment, it is possible to obtain the colored anti-counterfeit ink that exhibits the same color as the color pigment in the visible light region which is felt by human eyes, but has characteristic absorption in the near-infrared region. Note that this colored anti-counterfeit ink absorbs little in the visible light region, and therefore a color tone of the color pigment is retained. Further, a fluorescent material or a pearl pigment may be added.

Further for example, the anti-counterfeit ink obtained by mixing a black pigment as the color pigment which transmits the near-infrared rays, is recognized as equivalent black color in human eyes, compared with the black ink containing only black pigment, but it can be understood that when compared by irradiation of infrared rays, such a black anti-counterfeit ink has a different transmission profile. Accordingly, a printed matter using this black anti-counterfeit ink, for example, a printed matter printed with a barcode printed thereon, enables further complicated and advanced anti-counterfeit function by printing ordinary black ink that does not contain a near-infrared absorbing material, as a dummy.

Further, coating or printing of the black ink using the black pigment and other near-infrared ray transmitting color pigment is performed on a printing film of the printed matter obtained by printing the anti-counterfeit ink of the present invention on one side or both sides of a substrate to be printed, to thereby make the anti-counterfeit printed matter. This anti-counterfeit printed matter is colored black or otherwise recognized by human eyes, but letters, symbols etc., readable only by infrared rays are hidden and printed in the same area, and therefore it is possible to judge the authenticity of printed matter by irradiation of the infrared rays.

As such a color pigment, the black pigment which transmits the near-infrared rays is preferable. Further, preferable specific examples of the black pigment include, complex oxides such as Cu—Fe—Mn, Cu—Cr, Cu—Cr—Mn, Cu—Cr—Mn—Ni, Cu—Cr—Fe, and Co—Cr—Fe, etc., or titanium black, titanium nitride, titanium oxynitride, dark azo pigment, perylene black pigment, aniline black pigment, and carbon black. The dispersed particle size of the black pigment in the anti-counterfeit ink is preferably 200 nm or less, more preferably 100 nm or less like the near infrared ray-absorbing ultrafine particles. The reason therefore is the same as in the case of the above-described composite tungsten oxide ultrafine particles.

Further, by decreasing the dispersed particle size of the black pigment, the color tone appears deep and is likely to be favored as a design. Further, when fine printing is required, light scattering is reduced by decreasing the dispersed particle size of the color pigment, which is preferable because an outline of printed pattern becomes clear.

In the composite tungsten oxide ultrafine particles contained in the anti-counterfeit ink composition and the anti-counterfeit ink, the volatile component of 2.5 mass % is sometimes contained, by passing through the composite tungsten oxide ultrafine particle dispersion liquid or by being in a storage state of the composite tungsten oxide ultrafine particles in the process of producing the anti-counterfeit ink composition and the anti-counterfeit ink.

Further, in the anti-counterfeit ink of the present invention, it is possible to make a general blend of the anti-counterfeit ink of the present invention in accordance with a printing method, such as gravure ink, screen ink, offset ink, melt thermal transfer ink, intaglio ink, ink jet ink, and flexo ink, and a plasticizer for plastic, an oxidant inhibitor, a thickener, a wax, and the like can be contained.

[e] Method for Producing the Anti-Counterfeit Ink Composition and Producing the Anti-Counterfeit Ink.

The anti-counterfeit ink of the present invention is produced by dispersing the composite tungsten oxide ultrafine particles and optionally the color pigment in the solvent. As described above, as the solvent, it is possible to use the solvent composed of one kind or more selected from water, alcohols such as ethanol, ketones such as methyl ethyl ketone, toluene, xylene, vegetable oils, compounds derived from vegetable oils, and a petroleum solvent. As the vegetable oils, drying oils such as linseed oil, sunflower oil, tung oil and eno oil, semidrying oils such as sesame oil, cottonseed oil, rapeseed oil, soybean oil, rice bran oil, poppy seed oil and the like, non-drying oils such as olive oil, coconut oil, palm oil, dehydrated castor oil, can be preferably used. As the vegetable oil-derived compound, fatty acid monoesters obtained by direct esterification reaction of fatty acid of vegetable oil and monoalcohol, and ethers are preferably used. As petroleum-based solvents, Isopar E, Exol Hexane, Exol Heptane, Exol E, Exol D30, Exol D40, Exol D60, Exol D80, Exol D95, Exol D110, Exol D130 (all of them are manufactured by Exon Mobil Corporation), and the like having a high aniline point can be used. These solvents can be selected according to an intended use of the anti-counterfeit ink composition and the anti-counterfeit ink. Among them, the vegetable oils and the compounds derived from vegetable oils are preferable. This is because the vegetable oils and the compounds derived from vegetable oils do not erode rubber parts of printing equipment. Further, when the petroleum solvent is used instead of the vegetable oils or the compounds derived from the vegetable oils, the petroleum solvent having a high aniline point is preferable so as not to erode the rubber parts of the printing equipment. A method for dispersing the ultrafine composite tungsten oxide particles and the color pigment as needed into the solvent is not particularly limited, and use of the ultrasonic waves, the medium stirring mill, or the like is preferable because particles can be loosened and become finer.

The method for dispersing the composite tungsten oxide ultrafine particles in the liquid uncured material of resin curable by a solvent or energy rays to obtain the anti-counterfeit ink composition is not particularly limited as long as the fine particles can be uniformly dispersed in the solvent without aggregation. Examples of the dispersion method include a pulverization and dispersion treatment method using a device such as a bead mill, a ball mill, a sand mill, a paint shaker, an ultrasonic homogenizer, or the like. Among them, it is more preferable to use media stirring mills such as a bead mill, a ball mill, a sand mill, or a paint shaker in which media (beads, balls, ottawa sand) is used, because pulverization and dispersion to a desired particle size is possible for a short time by such media stirring mills. Through pulverization and dispersion treatment using these media stirring mills, formation of the fine particles is accelerated due to collision of the composite tungsten oxide ultrafine particles and collision of media against the ultrafine particles simultaneously with the dispersion of the composite tungsten oxide ultrafine particles in the dispersion liquid, and the composite tungsten oxide ultrafine particles can be more finely pulverized and dispersed (namely, they are pulverized and dispersed).

[f] Anti-Counterfeit Printed Matter

The anti-counterfeit printed matter can be obtained by coating or printing the surface of the substrate to be printed with the anti-counterfeit ink of the present invention by a normal method. In this case, the anti-counterfeit printed matter is formed by removing the solvent by evaporation or the like to fix it to the surface of the substrate to be printed, or by irradiating the energy rays to cure the liquid uncured material of resin curable by energy rays, and fix it to the substrate to be printed.

Further, when the anti-counterfeit ink composition of the present invention does not contain the binder, a printing film is obtained by coating or printing the substrate to be printed and evaporating the solvent. However, in this case, it is preferable to provide a cover layer made of a transparent resin on the printing film in order to prevent peeling off of the printing film and falling off of the fine particles.

The content of the composite tungsten oxide ultrafine particles in the anti-counterfeit printed matter can be changed depending on the intended use, but it is usually preferably 0.05 $g/m^2$ or more. When the content is 0005 $g/m^2$ or more, the absorption in the near infrared region becomes conspicuous and a function as the anti-counterfeit ink is exhibited. Further, an upper limit of the content is not particularly limited, but when it is 4 $g/m^2$ or less, light in the visible light region is not greatly absorbed, which is preferable from a viewpoint of maintaining transparency. Note that the content of the composite tungsten oxide ultrafine particles can be evaluated by the content per 1 $m^2$ of the printing film, because all fillers act equally on the light beams incident on the printing surface.

As the substrate to be printed with the anti-counterfeit ink composition or the anti-counterfeit ink, the substrate suited for the intended use may be used, and a mixture of resin and pulp, a resin film, or the like can be used in addition to paper. Further, it is also acceptable that a surface of a seal is printed with the anti-counterfeit ink of the present invention, and this seal is attached to the substrate to be printed.

The anti-counterfeit printed matter of the present invention thus produced, cannot be duplicated by copying, etc., whose authenticity can be judged mechanically and reliably by irradiating infrared rays and detecting reflection or transmission thereof, regardless of visual judgment. In addition, inorganic ultrafine particles called composite tungsten oxide are used as infrared absorbing ultrafine particles and such ultrafine particles are applied to the substrate to be printed by a printing method. Therefore, the anti-counterfeit printed matter which is excellent in weather resistance and light resistance can be provided at a low cost.

EXAMPLES

The present invention will be specifically described hereafter, with reference to examples. However, the present invention is not limited to the examples described below.

Note that the optical properties of the printing film in the examples and comparative examples were measured using a spectrophotometer (U-4100, manufactured by Hitachi, Ltd.), and the visible light transmittance was measured according to JIS R 3106. Further, the dispersed particle size was shown by an average value measured by a particle size measuring device (ELS-8000 manufactured by Otsuka Electronics Co., Ltd.) based on a dynamic light scattering method as a principle. The average particle size of each composite tungsten oxide ultrafine particle dispersed in the printing film was measured by observing a transmission electron microscope image of the cross-section of the printing film. The transmission electron microscope image was observed using a transmission electron microscope (HF-2200, manufactured by Hitachi High-Technologies Corporation). The transmission electron microscopic image was processed using an image processing device to measure the particle size of 100 composite tungsten oxide ultrafine particles, and the average value thereof was taken as the average particle size. An X-ray diffraction pattern was measured by a powder X-ray diffraction method ($\theta$-2$\theta$ method) using a powder X-ray diffractometer (X'Pert-PRO/MPD manufactured by Spectris Co., Ltd. PANalytical). Further, in order to ensure objective quantification, every time the X-ray diffraction pattern of the composite tungsten oxide ultrafine particles was measured, the X-ray diffraction pattern of a silicon powder standard sample was measured, and the value of the peak intensity ratio was calculated each time.

Example 1

0.216 kg of $Cs_2CO_3$ was dissolved in 0.330 kg of water, which was then added to 1.000 kg of $H_2WO_4$, sufficiently stirred, and then dried to obtain a mixed powder of $Cs_{0.33}WO_3$ as a target composition.

Next, the high-frequency plasma reaction device described in FIG. 1 was used, and the inside of the reaction system was evacuated to about 0.1 Pa (about 0.001 Torr) by a vacuum evacuation device, and then the inside of the reaction system was completely replaced with argon gas to obtain a flow system of 1 atm. Thereafter, argon gas was introduced as a plasma gas into the reaction vessel at a flow rate of 30 L/min, and the argon gas and a helium gas were introduced as a sheath gas from a sheath gas feed port at a flow rate of 55 L/min of argon gas and 5 L/min of helium gas. Then, high-frequency power was applied to a water cooled copper coil for generating high-frequency plasma, to generate high-frequency plasma. At this time, in order to generate thermal plasma having a high temperature part of 10000 to 15000 K, the high-frequency power was set to 40 KW.

In this way, after generating the high-frequency plasma, the mixed powder was supplied into the thermal plasma at a rate of 50 g/min while feeding the argon gas as a carrier gas at a flow rate of 9 L/min from the gas feeding device 11.

As a result, the mixed powder was instantaneously evaporated in the thermal plasma, and rapidly solidified in a process of reaching the plasma tail flame part, resulting in ultrafine particles. The generated ultrafine particles of example 1 before pulverization were deposited on a recovery filter.

Figure 2:
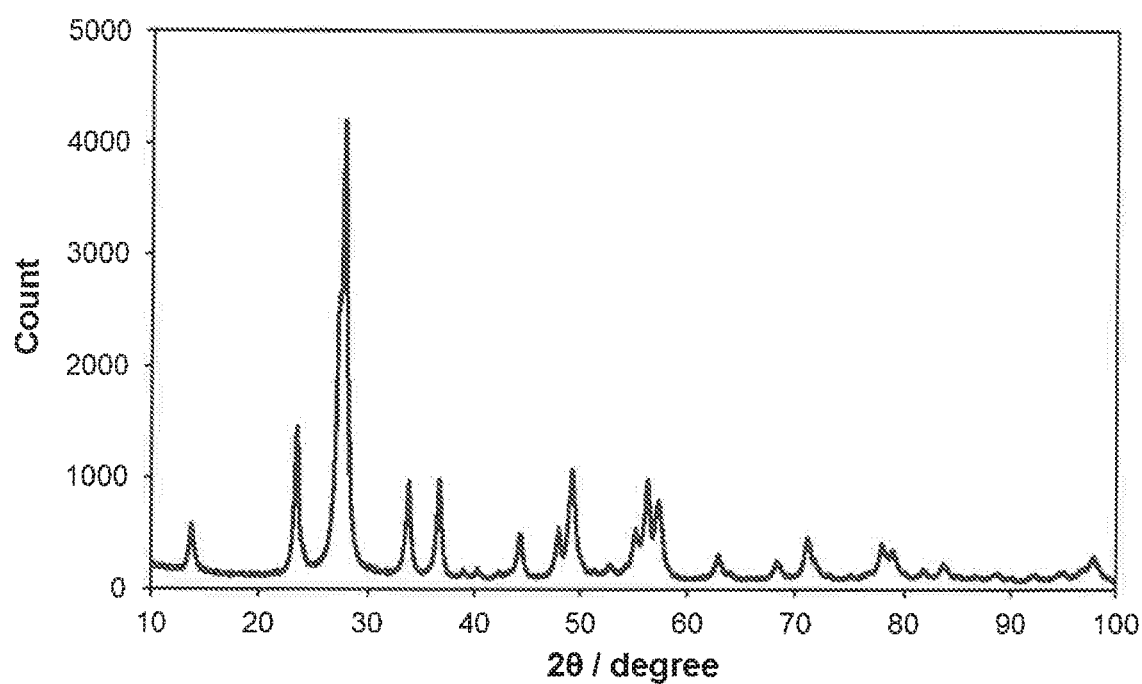
FIG. 2 is an X-ray diffraction pattern of ultrafine particles before pulverization according to example 1.

The deposited ultrafine particles of example 1 before pulverization were recovered, and the X-ray diffraction pattern was measured. The X-ray diffraction pattern of the obtained ultrafine particles is shown in FIG. 2. As a result of phase identification, the obtained ultrafine particles were identified as a hexagonal $Cs_{0.33}WO_3$ single phase. Further, when crystal structure analysis by the Rietveld analysis method was performed using the X-ray diffraction pattern, the crystallite size of each obtained ultrafine particles was 18.8 nm. Further, the value of the peak top intensity of the X-ray diffraction pattern of the obtained ultrafine particles before pulverization was 4200 counts.

The composition of the obtained ultrafine particles before pulverization was examined by ICP emission spectrometry. As a result, Cs concentration was 13.6 mass %, W concentration was 65.3 mass %, and a molar ratio of Cs/W was 0.29. It was confirmed that a remained part other than Cs and W was oxygen and no other impurity element contained in an amount of 1 mass % or more was present.

When a BET specific surface area of the obtained ultrafine particles before pulverization was measured using a BET specific surface area measuring device (HM model 1208 manufactured by Mountech), it was 60.0 m²/g. Note that nitrogen gas having a purity of 99.9% was used for measurement of the BET specific surface area.

Further, when the content of the volatile component of the composite tungsten oxide ultrafine particles of example 1 was measured using a moisture meter (MOC 63u, manufactured by Shimadzu Corporation), it was 1.6 mass %. Note that the temperature was raised from room temperature to 125° C. for 1 minute from start of the measurement, held at 125° C. for 9 minutes, and a weight reduction rate after 10 minutes from the start of the measurement was taken as the content of the volatile component.

10 mass % of the ultrafine particles of example 1 before pulverization, 10 mass % of an acrylic polymer dispersant (an acrylic dispersant having an amine value of 48 mg KOH/g, a decomposition temperature of 250° C.) having a group containing an amine as a functional group (hereinafter referred to as "dispersing agent a"), 80 mass % of methyl isobutyl ketone were weighed. These weighed materials were charged into a paint shaker containing 0.3 mmφ $ZrO_2$ heads, dispersed for 0.5 hours, to thereby obtain the composite tungsten oxide ultrafine particle dispersion liquid (referred to as "dispersion A" hereafter). Here, when the X-ray diffraction pattern of the composite tungsten oxide ultrafine particles in the dispersion A, that is, the composite tungsten oxide ultrafine particles after the pulverization and dispersion treatment was measured, the value of the peak top intensity was 3000 counts, and the peak position was $2\theta=27.8°$.

Then, when a silicon powder standard sample (produced by NIST, 640c) was prepared and the value of the peak intensity with (220) plane as a reference in the silicon powder standard sample was measured, it was 19800 counts. Accordingly, it was found that the value of the XRD peak intensity ratio of the composite tungsten oxide ultrafine particles was 0.15 after the pulverization and dispersion treatment of example 1, when the value of the peak intensity of the standard sample was set to 1.

Further, the crystallite size of each composite tungsten oxide ultrafine particle of example 1 after the pulverization and dispersion treatment was 16.9 nm.

100 g of this dispersion liquid A was mixed with 20 g of ultraviolet curing resin UV 3701 (produced by Toagosei Co., Ltd.) to thereby obtain the anti-counterfeit ink of example 1.

Table 1 shows the carrier gas flow rate condition and the material feed rate condition according to example 1 and other conditions.

As a substrate to be printed, a transparent PET film having a thickness of 50 μm was used, and the anti-counterfeit ink of example 1 was formed on the surface thereof with a bar coater. This film was dried at 70° C. for 1 minute to evaporate the solvent, then irradiated with ultraviolet rays using a high pressure mercury lamp so that the ultraviolet curing resin is cured, to thereby obtain the anti-counterfeit ink of example 1.

In the obtained printing film of example 1, the transmittance of light having a wavelength of 550 nm in the visible light region was 71%, and the transmittance of light having a wavelength of 1000 nm was 4%, and the transmittance of light having a wavelength of 1500 nm was 1%. The results are shown in Table 2. Further, when the average particle size of the composite tungsten oxide ultrafine particles dispersed in the obtained printing film of example 1 was calculated by an age processing apparatus using a transmission electron microscopic image, it was 17 nm which was almost the same as the above-described crystallite size of 16.9 nm.

Examples 2 to 6

The composite tungsten oxide ultrafine particles, the composite tungsten oxide ultrafine particle dispersion liquid, the anti-counterfeit ink, and the printing film of examples 2 to 6 were produced in the same manner as in the example 1, except that the carrier gas flow rate, the plasma gas flow rate, the sheath gas flow rate, and the raw material feed rate were changed. Table 1 shows the changed carrier gas flow rate condition, material feed rate condition, and other conditions.

Evaluations similar to those of example 1 were performed for the composite tungsten oxide ultrafine particles, the composite tungsten oxide ultrafine particle dispersion liquid, the anti-counterfeit ink, and the printing film of examples 2 to 6. The evaluation results are shown in the Table 2.

Example 7

The mixed powder of $Cs_2CO_3$ and $H_2WO_4$ described in example 1 was changed to the composite tungsten oxide expressed by $Cs_{0.33}WO_3$ fired at 800° C. under a mixed gas atmosphere of nitrogen gas and hydrogen gas, and was used as a raw material to be charged into a high-frequency plasma reactor. The composite tungsten oxide ultrafine particles, the composite tungsten oxide ultrafine particle dispersion liquid, the anti-counterfeit ink, and the printing film of example 7 were produced in the same manner as in the example 1 except for the above. Evaluations similar to those of examples 1 to 6 were performed for the obtained ultrafine particles, the dispersion liquid thereof, the anti-counterfeit ink, and the printing film. The production conditions and evaluation results are shown in Tables 1 and 2.

Example 8

The composite tungsten oxide ultrafine particles, the composite tungsten oxide ultrafine particle dispersion liquid, the anti-counterfeit ink, and the printing film of example 8 were produced in the same manner as in example 7 except that the carrier gas flow rate and the raw material feed rate were changed. Evaluations similar to those of examples 1 to 7 were performed for the obtained ultrafine particles, the dispersion liquid thereof, the anti-counterfeit ink, and printing film. The production conditions and evaluation results are shown in Tables 1 and 2.

Example 9

0.148 kg of $Rb_2CO_3$ was dissolved in 0.330 kg of water, added to 1.000 kg of $H_2WO_4$, sufficiently stirred, and then dried to obtain a mixed powder of $Rb_{0.32}WO_3$ as a target composition.

The composite tungsten oxide ultrafine particles, the composite tungsten oxide ultrafine particle dispersion liquid, the anti-counterfeit ink, and the printing film of example 9 were produced in the same manner as in example 1, except that the mixed powder was used as the raw material to be charged into the high-frequency thermal plasma reactor. Evaluations similar to those of examples 1 to 8 were performed for the obtained ultrafine particles, the dispersion liquid thereof, the anti-counterfeit ink, and the printing film. The production conditions and evaluation results are shown in Tables 1 and 2.

Example 10

0.375 kg of $K_2CO_3$ was dissolved in 0.330 kg of water, added to 1.000 kg of $H_2WO_4$, sufficiently stirred, and then dried to obtain a mixed powder of $K_{0.27}WO_3$ as a target composition.

The composite tungsten oxide ultrafine particles, the composite tungsten oxide ultrafine particle dispersion liquid, the anti-counterfeit ink, and the printing film of example 10 were produced in the same manner as in example 1, except that the mixed powder was used as the raw material to be charged into the high-frequency thermal plasma reactor. Evaluations similar to those of examples 1 to 9 were performed for the obtained ultrafine particles, the dispersion liquid thereof, the anti-counterfeit ink, and the printing film. The production conditions and evaluation results are shown in Tables 1 and 2.

Example 11

0.320 kg of $TlNO_3$ was dissolved in 0.330 kg of water, added to 1.000 kg of $H_2WO_4$, sufficiently stirred, and then dried to obtain a mixed powder of target $Tl_{0.19}WO_3$ as a target composition.

The composite tungsten oxide ultrafine particles, the composite tungsten oxide ultrafine particle dispersion liquid, the anti-counterfeit ink, and the printing film of example 11 were produced in the same manner as in example 1, except that the mixed powder was used as the raw material to be charged into the high-frequency thermal plasma reactor. Evaluations similar to those of examples 1 to 10 were performed for the obtained ultrafine particles, the dispersion liquid thereof, the anti-counterfeit ink, and the printing film. The production conditions and evaluation results are shown in Tables 1 and 2.

Example 12

0.111 kg of $BaCO_3$ was dissolved in 0.330 kg of water, added to 1.000 kg of $H_2WO_4$, sufficiently stirred, and then dried to obtain a mixed powder of $Ba_{0.14}WO_3$ as a target composition.

The composite tungsten oxide ultrafine particles, the composite tungsten oxide ultrafine particle dispersion liquid, the anti-counterfeit ink, and the printing film of example 12 were produced in the same manner as in example 1, except that the mixed powder was used as the raw material to be charged into the high-frequency thermal plasma reactor. Evaluations similar to those of examples 1 to 11 were performed for the obtained ultrafine particles, the dispersion liquid thereof, the anti-counterfeit ink, and the printing film. The production conditions and evaluation results are shown in Tables 1 and 2.

Example 13

0.0663 kg of $K_2CO_3$ and 0.0978 kg of $Cs_2CO_3$ were dissolved in 0.330 kg of water, added to 1.000 kg of $H_2WO_4$, sufficiently stirred, and then dried to obtain a mixed powder of $K_{0.24}Cs_{0.15}WO_3$ as a target composition.

The composite tungsten oxide ultrafine particles, the composite tungsten oxide ultrafine particle dispersion liquid, the anti-counterfeit ink, and the printing film of example 13 were produced in the same manner as in example 1, except that the mixed powder was used as the raw material to be charged into the high-frequency thermal plasma reactor. Evaluations similar to those of examples 1 to 12 were performed for the obtained ultrafine particles, the dispersion liquid thereof, the anti-counterfeit ink, and the printing film. The production conditions and evaluation results are shown in Tables 1 and 2.

Example 14

10.8 g of $Cs_2CO_3$ was dissolved in 16.5 g of water, the solution was added to 50 g of $H_2WO_4$, sufficiently stirred, and then dried. While feeding 2% $H_2$ gas with $N_2$ gas as a carrier, the dried product was heated, and fired at a temperature of 800° C. for 30 minutes. Thereafter, the composite tungsten oxide of example 14 was obtained by the solid-phase reaction method of firing at 800° C. for 90 minutes under an $N_2$ gas atmosphere.

In the same manner as in example 1 except for the above matter, the composite tungsten oxide ultrafine particle dispersion liquid, the anti-counterfeit ink, and the printing film of example 14 were obtained, and evaluations similar to those of examples 1 to 13 were performed. The dispersion time by the paint shaker was set to 2 hours. The production conditions and evaluation results are shown in Tables 1 and 2.

Examples 15 to 24

0.044 kg of $Li_2CO_3$ was dissolved in 0.330 kg of water, added to 1.000 kg of $H_2WO_4$, sufficiently stirred, and then dried to obtain a mixed powder of $Li_{0.3}WO_3$ of example 15 as a target composition.

0.021 kg of $Na_2CO_3$ was dissolved in 0.330 kg of water, added to 1.000 kg of $H_2WO_4$, sufficiently stirred, and then dried to obtain a mixed powder of $Na_{0.1}WO_3$ of example 16 as a target composition.

0.251 kg of $Cu(NO_3)_2 \cdot 3H_2O$ was dissolved in 0.330 kg of water, added to 1.000 kg of $H_2WO_4$, sufficiently stirred, and then dried to obtain a mixed powder of $Cu_{0.26}WO_{2.72}$ of example 17 as a target composition.

0.005 kg of $Ag_2CO_3$ was dissolved in 0.330 kg of water, added to 1.000 kg of $H_2WO_4$, sufficiently stirred, and then dried to obtain a mixed powder of $Ag_{0.01}WO_3$ of example 18 as a target composition.

0.040 kg of $CaCO_3$ was dissolved in 0.330 kg of water, added to 1.000 kg of $H_2WO_4$, sufficiently stirred, and then dried to obtain a mixed powder of $Ca_{0.1}WO_3$ of example 19 as a target composition.

0.047 kg of $SrCO_3$ was dissolved in 0.330 kg of water, added to 1.000 kg of $H_2WO_4$, sufficiently stirred, and then dried to obtain a mixed powder of $Sr_{0.08}WO_3$ of example 20 as a target composition.

0.011 kg of $In_2O_3$ and 1.000 kg of $H_2WO_4$ were sufficiently mixed by a mash-crushing machine to obtain a mixed powder of $In_{0.02}WO_3$ of example 21 as a target composition.

0.115 kg of $SnO_2$ and 1.000 kg of $H_2WO_4$ were sufficiently mixed by the mash-crushing machine to obtain a mixed powder of $Sn_{0.19}WO_3$ of example 22 as a target composition.

0.150 kg of $Yb_2O_3$ and 1.000 kg of $H_2WO_4$ were sufficiently mixed by the mash-crushing machine to obtain a mixed powder of $Yb_{0.19}WO_3$ of example 23 as a target composition.

0.115 kg of Snowtex S manufactured by Nissan Chemical Industries, Ltd. and 1.000 kg of $H_2WO_4$ were sufficiently mixed by the mash-crushing machine to obtain a mixed powder of $Si_{0.043}WO_{2.839}$ of example 24 as a target composition. Note that Snowtex S is an ultrafine silica powder.

The composite tungsten oxide ultrafine particles, the composite tungsten oxide ultrafine particle dispersion liquid, the anti-counterfeit ink, and the printing film of examples 15 to 24 were produced in the same manner as in example 1 except that the mixed powder of examples 15 to 24 was used as the raw material to be charged into the high-frequency thermal plasma reactor. Evaluations similar to those of examples 1 to 14 were performed for the obtained ultrafine particles, the dispersion liquid thereof, the anti-counterfeit ink, and the printing film. The production conditions and evaluation results are shown in Tables 1 and 2.

Example 25

0.216 g of $Cs_2CO_3$ was dissolved in 0.330 g of water, the solution was added to 1.000 kg of $H_2WO_4$, sufficiently stirred, and then dried to obtain a dried product. While feeding 5% $H_2$ gas with $N_2$ gas as a carrier, the dried product was heated, and fired at a temperature of 800° C. for 1 hour. Thereafter, the solid-phase reaction method was performed for further firing the dried product at 800° C. in the $N_2$ gas atmosphere for 2 hours, to obtain the composite tungsten oxide.

20 parts by weight of the obtained composite tungsten oxide and 80 parts by weight of water were mixed to prepare a slurry of about 60 g. Note that no dispersant was added to this slurry. This slurry was charged into a paint shaker together with heads and dispersed for 4 hours to obtain an aqueous dispersion liquid of composite tungsten oxide ultrafine particles. As beads, 0.3 mmϕ $ZrO_2$ beads were used. When the dispersed particle size of the composite tungsten oxide ultrafine particle aqueous dispersion liquid of example 25 was measured, it was 70 nm. As the setting of the dispersion particle size measurement, a particle refractive index was set to 1.81, and a particle shape was set as nonspherical. The background was measured with water and the solvent refractive index was set to 1.33.

Next, approximately 60 g of the obtained composite tungsten oxide ultrafine particle aqueous dispersion liquid was dried in an air dryer, to obtain the composite tungsten oxide ultrafine particles of example 25. Note that for the air dryer, a thermostatic oven SPH-201 type (manufactured by Espec Corporation) was used, a drying temperature was set to 70° C., and a drying time was set to 96 hours.

The X-ray diffraction pattern of the composite tungsten oxide ultrafine particles of example 25 was measured and a phase was identified, and as a result, the obtained ultrafine particles were identified as having a hexagonal $Cs_{0.33}WO_3$ single phase. Further, in the X-ray diffraction pattern of the obtained ultrafine particles, the peak top intensity was 4200 counts, the peak position was $2\theta=27.8°$, and the crystallite size was 23.7 nm. On the other hand, when a silicon powder standard sample (manufactured by NIST, 640c) was prepared and a value of the peak intensity was measured, with plane (220) in the silicon powder standard sample as a reference, it was 19,800 counts. Accordingly, it was found that the value of the XRD peak intensity ratio of the composite tungsten oxide ultrafine particles was 0.21 after the pulverization and dispersion treatment of example 1, when the value of the peak intensity of the standard sample was set to 1.

The composition of the obtained ultrafine particles was examined by ICP emission spectrometry. As a result, Cs concentration was 15.2 mass %, W concentration was 64.6 mass %, and the molar ratio of Cs/W was 0.33. It was confirmed that a balance other than Cs and W was oxygen and no other impurity element contained by 1 mass % or more was present.

When the BET specific surface area of the composite tungsten oxide ultrafine particles of example 25 obtained by pulverization was measured, it was 42.6 m²/g.

Further, when the content of the volatile component of the composite tungsten oxide ultrafine particles of example 25 was measured, it was 2.2 mass %.

Further, 10 g of the obtained composite tungsten oxide ultrafine particles were dispersed in 80 g of methyl isobutyl ketone as a solvent and 10 g of dispersant a, to obtain the composite tungsten oxide ultrafine particle dispersion liquid of example 25.

When the dispersed particle size of each particle in the composite tungsten oxide ultrafine particle dispersion liquid of example 25 was measured, it was 80 nm. Note that as a setting of the particle size measurement, the particle refractive index was set to 1.81, and the particle shape was set as nonspherical. Note that, the background was measured using methyl isobutyl ketone and the solvent refractive index was set to 1.40.

50 g of the obtained dispersion liquid was mixed with 10 g of ultraviolet curing resin UV 3701 (produced by Toagosei Co., Ltd.), to obtain the anti-counterfeit ink of example 25.

A transparent PET film having a thickness of 50 μm as used as a substrate to be printed, and the anti-counterfeit ink of example 25 was applied on the surface thereof with a bar coater. This film was dried at 70° C. for 1 minute to evaporate the solvent, then irradiated with ultraviolet rays using a high pressure mercury lamp, so that the ultraviolet curing resin is cured, to obtain the anti-counterfeit ink of example 25.

When the average particle size of the composite tungsten oxide ultrafine particles dispersed in the printing film of example 25 was calculated by an image processing device using a transmission electron microscope image, it was 23 nm which was almost the same as the above-described crystallite size of 23.7 nm.

Further, in the obtained printing film of example 25, the transmittance of light having a wavelength of 550 nm in the visible light region was 71%, and the transmittance of light having a wavelength of 1000 nm was 4%, and the transmittance of light having a wavelength of 1500 nm was 1%. The results are shown in Table 2.

Example 26

The composite tungsten oxide ultrafine particles, the composite tungsten oxide ultrafine particle dispersion liquid, the anti-counterfeit ink, and the printing film of example 26 were produced in the same manner as in example 25 except that the drying treatment by the air dryer was changed to a vacuum drying treatment by a vacuum stirring type mash-crushing machine. An Ishikawa type stirring type mash-crushing machine 24P type (Manufactured by Tajima Kagaku Kikai Co., Ltd.) was used as the vacuum stirring type mash-crushing machine, and the drying temperature at the time of the vacuum drying treatment was set to 80° C., the drying time was set to 32 hours, the rotation frequency of the kneading mixer was set to 40 Hz, and a pressure in a vacuum container was set to 0.001 MPa or less. Evaluations similar to those of example 25 were performed for the obtained ultrafine particles, the dispersion liquid thereof, the anti-counterfeit ink, and the printing film. The production conditions and evaluation results are shown in Tables 1 and 2.

Example 27

The composite tungsten oxide ultrafine particles, the composite tungsten oxide ultrafine particle dispersion liquid, the anti-counterfeit ink, and the printing film of example 27 were produced in the same manner as in example 25 except that the drying treatment by the air dryer was changed to a spray drying treatment by a spray dryer. A spray dryer ODL-20 type (manufactured by Ohkawara Kakohki Co., Ltd.) was used as the spray dryer. Evaluations similar to those of example 25 were performed for the obtained ultrafine particles, the dispersion liquid thereof, the anti-counterfeit ink, and the printing film. The production conditions and evaluation results are shown in Tables 1 and Examples 28 to 30

The composite tungsten oxide ultrafine particles, the composite tungsten oxide ultrafine particle dispersion liquid, the anti-counterfeit ink, and the printing film of examples 28 to 30 were produced in the same manner as in examples 25 to 27 except that the pulverization treatment time by the paint shaker was changed to 2 hours. The pulverization treatment time by the paint shaker was set to 2 hours. Evaluations similar to those of examples 25 to 27 were performed for the obtained ultrafine particles, the dispersion liquid thereof, the anti-counterfeit ink, and the printing film. The production conditions and evaluation results are shown in Tables 1 and 2.

Examples 31 to 33

The composite tungsten oxide ultrafine particles, the composite tungsten oxide ultrafine particle dispersion liquid, the anti-counterfeit ink, and the printing film of examples 31 to 33 were produced by the same synthetic producing method as in the above-described examples 28 to 30, except that 20 parts by weight of the composite tungsten oxide and 80 parts by weight of propylene glycol monoethyl ether were mixed in preparing the slurry. Evaluations similar to those of example 25 were performed for the obtained ultrafine particles, the dispersion liquid thereof, the anti-counterfeit ink, and the printing film of examples 31 to 33. The production conditions and evaluation results are shown in Tables 1 and 2.

Example 34

The composite tungsten oxide ultrafine particles were obtained in the same manner as in example 1. Thereafter, 10 parts by weight of the obtained ultrafine particles, 80 parts by weight of methyl isobutyl ketone, and 10 parts by weight of dispersant a were mixed to prepare 50 g of slurry. The slurry was subjected to dispersion treatment for 0.5 hours with an ultrasonic homogenizer (US-600TCVP, manufactured by Nippon Seiki Seisakusho Co., Ltd.) to obtain the composite tungsten oxide ultrafine particle dispersion liquid of example 34. Other than the above matter, the anti-counterfeit ink and the printing film of example 34 were obtained in the same manner as in example 1. Evaluations similar to those of example 1 were performed for the composite tungsten oxide ultrafine particles, the composite tungsten oxide ultrafine particle dispersion liquid, the anti-counterfeit ink, and the printing film of examples 34. The production conditions and evaluation results are shown in Tables 1 and 2.

Comparative Examples 1 and 2

The composite tungsten oxide ultrafine particles, the composite tungsten oxide ultrafine particle dispersion liquid, the anti-counterfeit ink, and the printing film of comparative examples 1 and 2 were produced in the same manner as in example 1 except that the carrier gas flow rate, the plasma gas flow rate, the sheath gas flow rate, and the raw material feed rate were changed. Table 1 shows the changed carrier gas flow rate condition, raw material feed rate condition, and other conditions. Evaluations similar to those of examples 1 to 24 were performed for the obtained ultrafine particles and the dispersion liquid thereof, the anti-counterfeit ink, and the printing film. The evaluation results are shown in Table 2.

Comparative Example 3

The composite tungsten oxide ultrafine particles, the composite tungsten oxide ultrafine particle dispersion liquid, the anti-counterfeit ink, and the printing film of comparative example 3 were produced in the same manner as in example 1, except that in order to generate a thermal plasma having a high temperature part of 5000 to 10000 K, the high-frequency power was set to 15 KW. Evaluations similar to those of examples 1 to 24, and comparative examples 1 and 2 were performed for the obtained ultrafine particles, the dispersion liquid thereof, the anti-counterfeit ink, and the printing film. The production conditions and evaluation results are shown in Tables 1 and 2.

Comparative Example 4

The composite tungsten oxide ultrafine particle aqueous dispersion liquid of comparative example 4 was obtained in the same manner as in example 25 except that the pulverization and dispersion treatment was performed for 40 hours instead of 4 hours, which was performed when 20 parts by weight of the obtained composite tungsten oxide and 80 parts by weight of water were mixed to prepare about 60 g of slurry, and this slurry was charged into the medium stirring mill together with beads. When the dispersed particle size of the composite tungsten oxide ultrafine particle aqueous dispersion liquid of comparative example 4 was measured, it was 120 nm. Note that as the setting of the dispersed particle size measurement, the particle refractive index was set to 1.81, and the particle shape was set as nonspherical. Further, the background was measured with water, and the solvent refractive index was set to 1.33.

The X-ray diffraction pattern of the composite tungsten oxide ultrafine particles of comparative example 4 was measured and a phase was identified, and as a result, the obtained ultrafine particles were identified as having a hexagonal $Cs_{0.33}WO_3$ single phase. Further, the peak top intensity of the X-ray diffraction pattern of the obtained ultrafine particles was 1,300 counts, the peak position was $2\theta=27.8°$, and the crystallite size was 8.1 nm. On the other hand, when the silicon powder standard sample (manufactured by NIST, 640c) was prepared and the value of the peak intensity was measured, with plane (220) in the silicon powder standard sample as a reference, it was 19,800 counts. Accordingly, it was found that the value of the XRD peak intensity ratio of the composite tungsten oxide ultrafine particles was 0.07 after the pulverization and dispersion treatment of comparative example 4, when the value of the peak intensity of the standard sample was set to 1.

When the BET specific surface area of the composite tungsten oxide ultrafine particles of comparative example 4 obtained by pulverization was measured, it was 102.8 $m^2/g$.

Further, when the content of the volatile component of the composite tungsten oxide ultrafine particles of comparative example 4 was measured, it was 2.2 mass %.

10 g of the obtained composite tungsten oxide ultrafine particles were dispersed in 80 g of methyl isobutyl ketone and 10 g of dispersant a, to obtain the composite tungsten oxide ultrafine particle dispersion liquid of comparative example 4. Then, when the dispersed particle size of the composite tungsten oxide ultrafine particle dispersion liquid was measured, it was 120 nm. Further, as the setting of the dispersed particle size measurement, the particle refractive index was set to 1.81, and the particle shape was set as nonspherical. Note that the background was measured with methyl isobutyl ketone, and the solvent refractive index was set to 1.40.

The composite tungsten oxide ultrafine particle dispersion liquid of comparative example 4 was evaluated in the same manner as in comparative example 1. The results are shown in Tables 1 and 2.

Then, the anti-counterfeit ink and the printing film of comparative example 4 were obtained in the same manner as in example 1 except that the composite tungsten oxide ultrafine particle dispersion liquid of comparative example 4 was used, and evaluation was performed. The evaluation results are shown in Table 2.

CONCLUSION

As is apparent from Table 2, in the composite tungsten oxide ultrafine particles contained in the printing film of examples 1 to 34, are the composite tungsten oxide ultrafine particles in which the XRD peak top intensity ratio of the composite tungsten oxide ultrafine particles with respect to the value of the XRD peak intensity of the silicon powder standard sample (NIST, 640c) is 0.13 or more with (220) plane as a reference, and the crystallize size is 1 nm or more. The composite tungsten oxide ultrafine particles had lower transmittances at wavelengths of 1000 nm and 1500 nm, had higher contrast due to near infrared irradiation and exhibited more excellent near infrared absorption characteristics than the composite tungsten oxide ultrafine particles of comparative examples 1 to 4, Then, in examples 1 to 34, the average particle size and the crystallite size of each composite tungsten oxide ultrafine particle in the printing film are substantially the same, and therefore these composite tungsten oxide ultrafine particles are considered to be single crystals in which the volume ratio of the amorphous phase is 50% or less. In contrast, in comparative examples 1, 2, and 4, it is considered that the average particle size of each composite tungsten oxide ultrafine particle in the printing film is larger than the crystallite size and therefore these composite tungsten oxide ultrafine particles are not considered to be single crystals. Further, in comparative example 3, hetero phases ($WO_2$ and W) were generated.

As described above, it is found that excellent anti-counterfeit ink printed matter can be obtained by using the anti-counterfeit ink produced using the composite tungsten oxide ultrafine particles of the examples.

TABLE 1

| | | Firing condition | | | | | | | | Pulverization and dispersion treatment | | |
|---|---|---|---|---|---|---|---|---|---|---|---|---|
| | | Thermal plasma method | | | | | Solid phase reaction method | | | | | |
| | Raw material | Plasma temperature [K] | *1 [kW] | Carrier gas (Ar) (L/min) | Plasma gas (Ar) (L/min) | Sheath gas (L/min) | Raw material feed rate (g/min) | In-furnace temperature [° C.] | In-furnace gas | Firing time | Solvent | *2 (hr) | Drying treatment device |
| Example 1 | $Cs_2CO_3$ & $H_2WO_4$ | 10000-15000 | 40 | 9 | 30 | Ar55 He5 | 50 | — | — | — | MIBK | 0.5 | — |
| Example 2 | $Cs_2CO_3$ & $H_2WO_4$ | 10000-15000 | 40 | 8 | 30 | Ar55 He5 | 25 | — | — | — | MIBK | 0.5 | — |
| Example 3 | $Cs_2CO_3$ & $H_2WO_4$ | 10000-15000 | 40 | 6 | 30 | Ar55 He5 | 25 | — | — | — | MIBK | 0.5 | — |
| Example 4 | $Cs_2CO_3$ & $H_2WO_4$ | 10000-15000 | 40 | 9 | 45 | Ar55 He5 | 50 | — | — | — | MIBK | 0.5 | — |
| Example 5 | $Cs_2CO_3$ & $H_2WO_4$ | 10000-15000 | 40 | 9 | 30 | Ar65 He5 | 50 | — | — | — | MIBK | 0.5 | — |
| Example 6 | $Cs_2CO_3$ & $H_2WO_4$ | 10000-15000 | 40 | 6 | 45 | Ar55 He5 | 25 | — | — | — | MIBK | 0.5 | — |
| Example 7 | $Cs_{0.33}WO_3$ | 10000-15000 | 40 | 9 | 30 | Ar55 He5 | 50 | — | — | — | MIBK | 0.5 | — |
| Example 8 | $Cs_{0.33}WO_3$ | 10000-15000 | 40 | 6 | 30 | Ar55 He5 | 25 | — | — | — | MIBK | 0.5 | — |
| Example 9 | $Rb_2CO_3$ & $H_2WO_4$ | 10000-15000 | 40 | 9 | 30 | Ar55 He5 | 50 | — | — | — | MIBK | 0.5 | — |
| Example 10 | $K_2CO_3$ & $H_2WO_4$ | 10000-15000 | 40 | 9 | 30 | Ar55 He5 | 50 | — | — | — | MIBK | 0.5 | — |
| Example 11 | $TlNO_3$ & $H_2WO_4$ | 10000-15000 | 40 | 9 | 30 | Ar55 He5 | 50 | — | — | — | MIBK | 0.5 | — |
| Example 12 | $BaCO_3$ & $H_2WO_4$ | 10000-15000 | 40 | 9 | 30 | Ar55 He5 | 50 | — | — | — | MIBK | 0.5 | — |
| Example 13 | $K_2CO_3$ & $Cs_2CO_3$ & $H_2WO_4$ | 10000-15000 | 40 | 9 | 30 | Ar55 He5 | 50 | — | — | — | MIBK | 0.5 | — |
| Example 14 | $Cs_2CO_3$ & $H_2WO_4$ | | | | — | | | 800 800 | $N_2$ carrier, 2% $H_2$ $N_2$ atmosphere | 30 min 90 min | MIBK | 2 | — |
| Example 15 | $Li_2CO_3$ & $H_2WO_4$ | 10000-15000 | 40 | 9 | 30 | Ar55 He5 | 50 | — | — | — | MIBK | 0.5 | — |
| Example 16 | $Na_2CO_3$ & $H_2WO_4$ | 10000-15000 | 40 | 9 | 30 | Ar55 He5 | 50 | — | — | — | MIBK | 0.5 | — |
| Example 17 | $Cu(NO_3)_2 \cdot 3H_2O$ & $H_2WO_4$ | 10000-15000 | 40 | 9 | 30 | Ar55 He5 | 50 | — | — | — | MIBK | 0.5 | — |
| Example 18 | $Ag_2CO_3$ & $H_2WO_4$ | 10000-15000 | 40 | 9 | 30 | Ar55 He5 | 50 | — | — | — | MIBK | 0.5 | — |
| Example 19 | $CaCO_3$ & $H_2WO_4$ | 10000-15000 | 40 | 9 | 30 | Ar55 He5 | 50 | — | — | — | MIBK | 0.5 | — |
| Example 20 | $SrCO_3$ & $H_2WO_4$ | 10000-15000 | 40 | 9 | 30 | Ar55 He5 | 50 | — | — | — | MIBK | 0.5 | — |
| Example 21 | $In_2O_3$ & $H_2WO_4$ | 10000-15000 | 40 | 9 | 30 | Ar55 He5 | 50 | — | — | — | MIBK | 0.5 | — |

TABLE 1-continued

| | | Firing condition | | | | | | | | | | |
|---|---|---|---|---|---|---|---|---|---|---|---|---|
| | | Thermal plasma method | | | | | | Solid phase reaction method | | | Pulverization and dispersion treatment | | |
| | Raw material | Plasma temperature [K] | *1 [kW] | Carrier gas (Ar) (L/min) | Plasma gas (Ar) (L/min) | Sheath gas (L/min) | Raw material feed rate (g/min) | In-furnace temperature [°C] | In-furnace gas | Firing time | Solvent | *2 (hr) | Drying treatment device |
| Example 22 | $SnO_2$&$H_2WO_4$ | 10000–15000 | 40 | 9 | 30 | Ar55 He5 | 50 | — | — | | MIBK | 0.5 | — |
| Example 23 | $Yb_2O_3$&$H_2WO_4$ | 10000–15000 | 40 | 9 | 30 | Ar55 He5 | 50 | — | — | | MIBK | 0.5 | — |
| Example 24 | Snowtex S&$H_2WO_4$ | 10000–15000 | 40 | 9 | 30 | Ar55 He5 | 50 | — | — | | MIBK | 0.5 | — |
| Example 25 | $Cs_2CO_3$&$H_2WO_4$ | | | | | | | 800 800 | $N_2$ carrier, 5% $H_2$ $N_2$ atmosphere | 1 hr 2 hr | Water | 4 | Air dryer |
| Example 26 | $Cs_2CO_3$&$H_2WO_4$ | | | | | | | 800 800 | $N_2$ carrier, 5% $H_2$ $N_2$ atmosphere | 1 hr 2 hr | Water | 4 | Ishikawa type stirring type mash-crushing machine |
| Example 27 | $Cs_2CO_3$&$H_2WO_4$ | | | | | | | 800 800 | $N_2$ carrier, 5% $H_2$ $N_2$ atmosphere | 1 hr 2 hr | Water | 4 | Spray dryer |
| Example 28 | $Cs_2CO_3$&$H_2WO_4$ | | | | | | | 800 800 | $N_2$ carrier, 5% $H_2$ $N_2$ atmosphere | 1 hr 2 hr | Water | 2 | Air dryer |
| Example 29 | $Cs_2CO_3$&$H_2WO_4$ | | | | | | | 800 800 | $N_2$ carrier, 5% $H_2$ $N_2$ atmosphere | 1 hr 2 hr | Water | 2 | Ishikawa type stirring type mash-crushing machine |
| Example 30 | $Cs_2CO_3$&$H_2WO_4$ | | | | | | | 800 800 | $N_2$ carrier, 5% $H_2$ $N_2$ atmosphere | 1 hr 2 hr | Water | 2 | Spray dryer |
| Example 31 | $Cs_2CO_3$&$H_2WO_4$ | | | | | | | 800 800 | $N_2$ carrier, 5% $H_2$ $N_2$ atmosphere | 1 hr 2 hr | *3 | 2 | Air dryer |
| Example 32 | $Cs_2CO_3$&$H_2WO_4$ | | | | | | | 800 800 | $N_2$ carrier, 5% $H_2$ $N_2$ atmosphere | 1 hr 2 hr | *3 | 2 | Ishikawa type stirring type mash-crushing machine |
| Example 33 | $Cs_2CO_3$&$H_2WO_4$ | | | | | | | 800 800 | $N_2$ carrier, 5% $H_2$ $N_2$ atmosphere | 1 hr 2 hr | *3 | 2 | Spray dryer |
| Example 34 | $Cs_2CO_3$&$H_2WO_4$ | | | Same as example 1 | | | | | | | MIBK | 0.5* | — |
| Comparative example 1 | $Cs_2CO_3$&$H_2WO_4$ | 10000–15000 | 40 | 3 | 30 | Ar55 He5 | 15 | — | — | | MIBK | 0.5 | — |
| Comparative example 2 | $Cs_2CO_3$&$H_2WO_4$ | 10000–15000 | 40 | 9 | 15 | Ar55 He5 | 50 | — | — | | MIBK | 0.5 | — |
| Comparative example 3 | $Cs_2CO_3$&$H_2WO_4$ | 5000–10000 | 15 | 9 | 30 | Ar55 He5 | 50 | — | — | | MIBK | 0.5 | — |
| Comparative example 4 | $Cs_2CO_3$&$H_2WO_4$ | | | | | | | 800 800 | $N_2$ carrier, 5% $H_2$ $N_2$ atmosphere | 1 hr 2 hr | Water | 4.0 | Air dryer |

Wherein 0.5*: ultrasonic homogenizer 0.5 hr
*1 High frequency power
*2 Pulverization and dispersion treatment time
*3 Propylene glycol monoethyl ether

TABLE 2

| | Crystal system | Hetero phase | Peak top intensity *1 (count) | Peak top intensity *2 (count) | Peak intensity of plane (220) of standard sample | Peak top intensity ratio | 2θ at peak position [°] | BET [m²/g] | x/y | Crystallite size [nm] | *3 (%) | Dispersed particle size [nm] | Particle size in printing film [nm] | Transmittance 550 nm [%] | Transmittance 1000 nm [%] | Transmittance 1500 nm [%] |
|---|---|---|---|---|---|---|---|---|---|---|---|---|---|---|---|---|
| Example 1 | Hexagonal crystal structure | Absent | 4200 | 3000 | 19800 | 0.15 | 27.8 | 60.0 | 0.29 | 16.9 | 1.6 | 70 | 17 | 71 | 4 | 1 |
| Example 2 | Hexagonal crystal structure | Absent | 4700 | 3400 | 19800 | 0.17 | 27.8 | 51.6 | 0.29 | 19.5 | 1.5 | 80 | 19 | 71 | 4 | 1 |
| Example 3 | Hexagonal crystal structure | Absent | 5400 | 4200 | 19800 | 0.21 | 27.8 | 41.6 | 0.29 | 21.1 | 1.4 | 80 | 21 | 70 | 4 | 1 |
| Example 4 | Hexagonal crystal structure | Absent | 4500 | 3100 | 19800 | 0.16 | 27.8 | 54.8 | 0.29 | 18.7 | 1.6 | 80 | 19 | 71 | 4 | 1 |
| Example 5 | Hexagonal crystal structure | Absent | 4400 | 3100 | 19800 | 0.16 | 27.8 | 57.8 | 0.29 | 17.9 | 1.6 | 70 | 18 | 71 | 4 | 1 |
| Example 6 | Hexagonal crystal structure | Absent | 5800 | 4500 | 19800 | 0.23 | 27.8 | 37.8 | 0.30 | 28.2 | 1.3 | 80 | 28 | 70 | 3 | 1 |
| Example 7 | Hexagonal crystal structure | Absent | 5200 | 4000 | 19800 | 0.20 | 27.8 | 44.7 | 0.29 | 23.0 | 1.4 | 80 | 22 | 70 | 4 | 1 |
| Example 8 | Hexagonal crystal structure | Absent | 5700 | 4400 | 19800 | 0.22 | 27.8 | 38.3 | 0.30 | 29.0 | 1.3 | 80 | 29 | 70 | 3 | 1 |
| Example 9 | Hexagonal crystal structure | Absent | 4000 | 3000 | 19800 | 0.15 | 27.9 | 62.5 | 0.32 | 17.2 | — | 70 | 17 | 71 | 7 | 3 |
| Example 10 | Hexagonal crystal structure | Absent | 3800 | 2900 | 19800 | 0.15 | 27.9 | 64.2 | 0.27 | 17.5 | — | 70 | 17 | 71 | 11 | 5 |
| Example 11 | Hexagonal crystal structure | Absent | 4000 | 2900 | 19800 | 0.15 | 27.9 | 62.3 | 0.19 | 18.5 | — | 80 | 18 | 71 | 11 | 5 |
| Example 12 | Hexagonal crystal structure | Absent | 4200 | 3100 | 19800 | 0.16 | 28.1 | 60.8 | 0.14 | 17.3 | — | 70 | 17 | 71 | 11 | 5 |
| Example 13 | Hexagonal crystal structure | Absent | 4000 | 3200 | 19800 | 0.16 | 28.0 | 62.3 | 0.39 | 18.0 | — | 80 | 18 | 70 | 10 | 5 |
| Example 14 | Hexagonal crystal structure | Absent | 22000 | 4200 | 19800 | 0.21 | 27.8 | 1.2 | 0.33 | 23.9 | — | 80 | 23 | 71 | 7 | 3 |
| Example 15 | Cubic crystal structure | Absent | 3600 | 2600 | 19800 | 0.13 | 23.9 | 110.3 | 0.30 | 16.1 | — | 70 | 16 | 71 | 11 | 5 |
| Example 16 | Tetragonal crystal structure | Absent | 3600 | 2600 | 19800 | 0.13 | 23.4 | 90.3 | 0.10 | 16.9 | — | 70 | 17 | 71 | 11 | 5 |
| Example 17 | Monoclinic crystal structure | Absent | 3700 | 2700 | 19800 | 0.14 | 23.1 | 71.3 | 0.27 | 17.5 | — | 70 | 17 | 71 | 12 | 6 |
| Example 18 | Orthorhombic crystal structure | Absent | 4100 | 3200 | 19800 | 0.16 | 24.2 | 62.9 | 0.01 | 17.8 | — | 70 | 17 | 71 | 11 | 5 |
| Example 19 | Tetragonal crystal structure | Absent | 4000 | 3100 | 19800 | 0.16 | 23.5 | 61.0 | 0.10 | 17.5 | — | 70 | 17 | 71 | 11 | 5 |
| Example 20 | Tetragonal crystal structure | Absent | 4100 | 3100 | 19800 | 0.16 | 23.6 | 60.5 | 0.08 | 17.8 | — | 70 | 17 | 70 | 11 | 5 |
| Example 21 | Tetragonal crystal structure | Absent | 4100 | 3200 | 19800 | 0.16 | 24.0 | 59.8 | 0.02 | 18.0 | — | 80 | 18 | 70 | 11 | 5 |
| Example 22 | Tetragonal crystal structure | Absent | 4200 | 3100 | 19800 | 0.16 | 23.6 | 58.5 | 0.19 | 18.2 | — | 80 | 18 | 71 | 11 | 5 |

TABLE 2-continued

| | Hetero phase | Crystal system | Peak top intensity *1 (count) | Peak top intensity *2 (count) | Peak intensity of plane (220) of standard sample | Peak top intensity ratio | 2θ at peak position [°] | BET [m²/g] | x/y | Crystallite size [nm] | *3 (%) | Dispersed particle size [nm] | Particle size in printing film [nm] | Transmittance 550 nm [%] | Transmittance 1000 nm [%] | Transmittance 1500 nm [%] |
|---|---|---|---|---|---|---|---|---|---|---|---|---|---|---|---|---|
| Example 23 | Absent | Cubic crystal structure | 4400 | 3400 | 19800 | 0.17 | 23.1 | 57.1 | 0.19 | 18.4 | — | 80 | 18 | 70 | 11 | 5 |
| Example 24 | Absent | Monoclinic crystal structure | 4000 | 3100 | 19800 | 0.16 | 23.5 | 61.3 | 0.04 | 17.7 | — | 70 | 17 | 71 | 11 | 5 |
| Example 25 | Absent | Hexagonal crystal structure | 4200 | 4200 | 19800 | 0.21 | 27.8 | 42.6 | 0.33 | 23.7 | 2.2 | 80 | 23 | 71 | 3 | 1 |
| Example 26 | Absent | Hexagonal crystal structure | 4200 | 4200 | 19800 | 0.21 | 27.8 | 41.2 | 0.33 | 24.1 | 1.5 | 80 | 24 | 71 | 3 | 1 |
| Example 27 | Absent | Hexagonal crystal structure | 4100 | 4100 | 19800 | 0.21 | 27.8 | 42.3 | 0.33 | 23.9 | 1.5 | 80 | 23 | 71 | 3 | 1 |
| Example 28 | Absent | Hexagonal crystal structure | 6200 | 6200 | 19800 | 0.31 | 27.8 | 34.3 | 0.33 | 38.2 | 1.5 | 80 | 38 | 71 | 4 | 1 |
| Example 29 | Absent | Hexagonal crystal structure | 5900 | 5900 | 19800 | 0.30 | 27.8 | 32.2 | 0.33 | 37.8 | 1.3 | 80 | 37 | 71 | 4 | 1 |
| Example 30 | Absent | Hexagonal crystal structure | 6000 | 6000 | 19800 | 0.30 | 27.8 | 31.3 | 0.33 | 38.5 | 1.3 | 80 | 38 | 71 | 4 | 1 |
| Example 31 | Absent | Hexagonal crystal structure | 5500 | 5500 | 19800 | 0.28 | 27.8 | 31.6 | 0.33 | 36.7 | 1.6 | 80 | 36 | 71 | 4 | 1 |
| Example 32 | Absent | Hexagonal crystal structure | 5400 | 5400 | 19800 | 0.27 | 27.8 | 32.3 | 0.33 | 36.3 | 1.3 | 80 | 32 | 71 | 4 | 1 |
| Example 33 | Absent | Hexagonal crystal structure | 5300 | 5300 | 19800 | 0.27 | 27.8 | 33.2 | 0.33 | 36.0 | 1.3 | 80 | 36 | 71 | 4 | 1 |
| Example 34 | Absent | Hexagonal crystal structure | 4200 | 4200 | 19800 | 0.21 | 27.8 | 60.0 | 0.29 | 16.9 | 1.6 | 70 | 16 | 71 | 4 | 1 |
| Comparative example 1 | Absent | Hexagonal crystal structure | 1000 | 1000 | 19800 | 0.05 | 27.8 | 90.2 | 0.29 | 8.0 | — | 80 | 20 | 72 | 52 | 42 |
| Comparative example 2 | Absent | Hexagonal crystal structure | 1100 | 1100 | 19800 | 0.06 | 27.8 | 86.0 | 0.29 | 9.2 | — | 80 | 23 | 72 | 51 | 41 |
| Comparative example 3 | WO$_2$&W | Hexagonal crystal structure | 3200 | 2400 | 19800 | 0.12 | 27.8 | 43.0 | 0.29 | 22.9 | — | 80 | 23 | 72 | 49 | 38 |
| Comparative example 4 | Absent | Hexagonal crystal structure | 1300 | 1300 | 19800 | 0.07 | 27.8 | 102.8 | 0.33 | 8.1 | 2.2 | 120 | 120 | 72 | 49 | 38 |

*1 Raw material powder
*2 After dispersion
*3 Volatile component

DESCRIPTION OF SIGNS AND NUMERALS

1. Thermal plasma
2. High frequency coil
3. Sheath gas feeding nozzle
4. Plasma gas feeding nozzle
5. Raw material powder feeding nozzle
6. Reaction vessel
7. Aspiration tube
8. Filter

The invention claimed is:

1. An anti-counterfeit ink composition containing composite tungsten oxide ultrafine particles, wherein a value of an XRD peak top intensity ratio of the composite tungsten oxide ultrafine particles is 0.13 or more when a value of the XRD peak intensity is set to 1, with plane (220) of a silicon powder standard sample 640c produced by NIST as a reference.

2. The anti-counterfeit ink composition according to claim 1, wherein the composite tungsten oxide ultrafine particles are composite tungsten oxide expressed by $M_xW_yO_z$ wherein M element is an element of one or more kinds selected from H, He, alkali metal, alkaline earth metal, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, and Yb, W is tungsten, O is oxygen, satisfying $0.001 \leq x/y \leq 1$ and $2.2 \leq z/y \leq 3.0$.

3. The anti-counterfeit ink composition according to claim 1, wherein a crystallite size of each composite tungsten oxide ultrafine particle is 1 nm or more and 200 nm or less.

4. The anti-counterfeit ink composition according to claim 1, wherein a surface of each composite tungsten oxide ultrafine particle is coated with a compound containing at least one element selected from Si, Ti, Al, and Zr.

5. The anti-counterfeit ink composition according to claim 1, wherein a content of a volatile component of the composite tungsten oxide ultrafine particles is 2.5 mass % or less.

6. The anti-counterfeit ink composition according to claim 1, which contains a solvent, and/or a liquid uncured material of resin curable by energy rays.

7. An anti-counterfeit ink containing the anti-counterfeit ink composition described in claim 1 and organic binder.

8. An anti-counterfeit printed matter including a printing section printed with the anti-counterfeit ink of described in claim 7.

9. A method for producing an anti-counterfeit ink composition containing composite tungsten oxide ultrafine particles, a solvent and/or a liquid uncured material of resin curable by energy rays,
wherein the composite tungsten oxide ultrafine particles in which a value of an XRD peak top intensity ratio of the composite tungsten oxide ultrafine particles is 0.13 or more when a value of the XRD peak intensity is set to 1, with plane (220) of a silicon powder standard sample 640c produced by NIST as a reference, are dispersed in the solvent and/or the liquid uncured material of resin curable by energy rays.

10. The method for producing an anti-counterfeit ink composition according to claim 9, wherein the composite tungsten oxide ultrafine particles are composite tungsten oxide expressed by $M_xW_yO_z$ wherein M element is an element of one or more kinds selected from H, He, alkali metal, alkaline earth metal, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, and Yb, W is tungsten, O is oxygen, satisfying $0.001 \leq x/y \leq 1$ and $2.2 \leq z/y \leq 3.0$.

11. The method for producing the anti-counterfeit ink composition of claim 9, wherein a crystallite size of each composite tungsten oxide ultrafine particle is 10 nm or more and 200 nm or less.

12. The method for producing an anti-counterfeit ink composition according to claim 9, wherein a surface of each composite tungsten oxide ultrafine particle is coated with a compound containing at least one element selected from Si, Ti, Al, and Zr.

13. The method for producing an anti-counterfeit ink composition according to claim 9, wherein a content of a volatile component in the composite tungsten oxide ultrafine particles is 2.5 mass % or less.

* * * * *